US008250090B2

(12) United States Patent
Brignoli

(10) Patent No.: US 8,250,090 B2
(45) Date of Patent: Aug. 21, 2012

(54) METHOD FOR PERFORMING MESSAGE-BASED DISTRIBUTED COMPUTING, INVOLVES EXECUTING EXPRESSION OF MATCHED MESSAGE RESPONSE ON MEMBERS IDENTIFIED BY SET INSTANCE DEFINITION USING DIMENSION VALUES DERIVED FROM MESSAGE

(76) Inventor: Winthrop A. Brignoli, New York, NY (US)

( * ) Notice: Subject to any disclaimer, the term of this patent is extended or adjusted under 35 U.S.C. 154(b) by 215 days.

(21) Appl. No.: 12/710,254

(22) Filed: Feb. 22, 2010

(65) Prior Publication Data

US 2011/0208746 A1    Aug. 25, 2011

(51) Int. Cl.
*G06F 17/30* (2006.01)
(52) U.S. Cl. ........ 707/769; 707/803; 707/758; 707/747; 717/124; 717/151; 709/217; 709/246
(58) Field of Classification Search .................. 707/747, 707/769, 805, 758, 803; 709/238, 213, 245; 717/151, 124
See application file for complete search history.

(56) References Cited

U.S. PATENT DOCUMENTS

| 5,357,630 | A | * | 10/1994 | Oprescu et al. ........................ 1/1 |
| 5,745,703 | A | * | 4/1998 | Cejtin et al. .................. 709/238 |
| 6,016,393 | A | * | 1/2000 | White et al. .................. 719/315 |
| 6,263,366 | B1 | | 7/2001 | Jacobs et al. |
| 7,146,603 | B2 | | 12/2006 | Kerpan et al. |
| 7,458,082 | B1 | * | 11/2008 | Slaughter et al. ............. 719/328 |
| 7,590,680 | B2 | | 9/2009 | Fernando et al. |
| 7,979,569 | B2 | * | 7/2011 | Eisner et al. .................. 709/231 |
| 2007/0027912 | A1 | | 2/2007 | Chrysanthakopoulos |
| 2007/0067471 | A1 | | 3/2007 | Wolfe et al. |
| 2007/0079282 | A1 | | 4/2007 | Nachnani et al. |
| 2007/0165625 | A1 | * | 7/2007 | Eisner et al. .................. 370/389 |
| 2007/0168301 | A1 | * | 7/2007 | Eisner et al. ..................... 705/79 |
| 2007/0171923 | A1 | * | 7/2007 | Eisner et al. .................. 370/401 |
| 2007/0171924 | A1 | * | 7/2007 | Eisner et al. .................. 370/401 |
| 2007/0180150 | A1 | * | 8/2007 | Eisner et al. .................. 709/246 |
| 2007/0198437 | A1 | * | 8/2007 | Eisner et al. ..................... 705/79 |

(Continued)

FOREIGN PATENT DOCUMENTS

WO    WO-02/25431    3/2002

OTHER PUBLICATIONS

International Search Report issued May 12, 2011 in International Application No. PCT/US2011/021897.

(Continued)

*Primary Examiner* — Jean M Corrielus
(74) *Attorney, Agent, or Firm* — Ropes & Gray LLP

(57) ABSTRACT

Systems and methods are provided for message-based distributed computing systems and execution of message-based distributed applications on such systems. The present invention provides a Distributed Application Platform (DAP). The DAP architecture is "distributed" because functions of an application may be performed by processes within a single node, spread across nodes in a network, or spread across processor cores within CPUs. Some embodiments of the DAP provide efficient programming constructs, called sets. A set is a data structure describing an N-dimensional space. Each spatial location is either empty or holds a member. The set construct allows automatic extraction and processing of members with a single query, and makes programming an application for a distributed, parallel, or single computer environment easier for a user. In some embodiments, the DAP may be a message-based distributed computing system. The system receives instructions, builds and initiates an application, and may create a set in memory.

36 Claims, 23 Drawing Sheets

U.S. PATENT DOCUMENTS

2008/0059975 A1     3/2008   Gioberti

OTHER PUBLICATIONS

Campanile et al., "Adaptable parsing of real-time data streams," 15th Euromicro International Conference on Parallel, Distributed and Network-Based Processing (PDP'07) (c) IEEE 2007.

Riley et al., "A Distributed Hash Table for Computational Grids," 18th International Parallel and Distributed Processing Symposium (IPDPS'04) (c) IEEE 2004.

Costanza, Context-oriented Programming in ContextL,? Celebrating the 50th Anniversary of Lisp, (c) ACM 2008.

Gassanenko, "Context-oriented programming," euroForth'98, (c) M.L.Gassanenko 1998.

Nieplocha et al., "Global Arrays: A Portable "Shared-Memory" Programming Model for Distributed Memory Computers," 1994 ACM/IEEE Conference on Supercomputing (c) 1994 IEEE.

van Engelen et al., "The gSOAP Toolkit for Web Services and Peer-To-Peer Computing Networks," 2nd IEEE International Symposium on Cluster Computing and the Grid (CCGrid2002), (c) IEEE.

Hirschfeld et al., "An Introduction to Context-Oriented Programming with ContextS," GTTSE 2007 (c) Springer-Verlag Berlin Heidelberg 2008.

Gonzalez et al., "Context-Oriented Programming with the Ambient Object System," Journal of Universal Computer Science, vol. 14, No. 20 (2008) © J.UCS 2008.

Benton et al., "Modern Concurrency Abstractions for C Sharp," ECOOP 2002, Springer-Verlag Berlin Heidelberg 2002.

Shelly et al., "Subjective Programming, Human Judgments and Optimality," (c) John Wiley & Sons, Inc. 1964, pp. 231-256.

Hirschfeld, "Modularizing Context-dependent Behavioral Variations with Context-oriented Programming," GTTSE 2007.

George Chrysanthakopoulos, "The Concurrency and Coordination Runtime and Decentralized Software Services Toolkit," Professional Developers Conference (PDC) 2008.

Microsoft Robotics Developer Studio. CCR Introduction. Retrieved from http://msdn.microsoft.com/en-us/library/bb648752(printer).aspx on Nov. 23, 2009.

Microsoft Robotics Developer Studio. CCR API Overview. Retrieved from http://msdn.microsoft.com/en-us/library/bb648748(printer).aspx on Nov. 23, 2009.

Microsoft Robotics Developer Studio. CCR Ports and PortSets. Retrieved from http://msdn.microsoft.com/en-us/library/bb648755(printer).aspx on Nov. 23, 2009.

Microsoft Robotics Developer Studio. CCR Coordination Primitives. Retrieved from http://msdn.microsoft.com/en-us/library/bb648749(printer).aspx on Nov. 23, 2009.

Microsoft Robotics Developer Studio. CCR Task Scheduling. Retrieved from http://msdn.microsoft.com/en-us/library/bb648756(printer).aspx on Nov. 23, 2009.

Microsoft Robotics Developer Studio. CCR Iterators. Retrieved from http://msdn.microsoft.com/en-us/library/bb648753(printer).aspx on Nov. 23, 2009.

Microsoft Robotics Developer Studio. CCR Failure Handling. Retrieved from http://msdn.microsoft.com/en-us/library/bb648750(printer).aspx on Dec. 2, 2010.

Microsoft Robotics Developer Studio. CCR Interop with Non-CCR Code. Retrieved from http://msdn.microsoft.com/en-us/library/bb648751(printer).aspx on Dec. 2, 2010.

Microsoft Robotics Developer Studio. Other Concurrency Approaches. Retrieved from http://msdn.microsoft.com/en-us/library/bb648754(printer).aspx on Dec. 2, 2010.

Microsoft Robotics Developer Studio. DSS Introduction. Retrieved from http://msdn.microsoft.com/en-us/library/bb483056.aspx on Dec. 2, 2010.

\* cited by examiner

DAP Client — 502
File  Edit  Execution
App Explorer  App Visualizer — 504

| Service Declaration | Instance | Installation Type | Initialization Parameters |
|---|---|---|---|
| Service1 | svc1 | User | |

---Type Declarations — 506
   string Symbol, string Status, string BuyOrSell, string Side
---Set Declarations — 508
   Orders (Symbol, Status)
---Message Declarations — 510
   New(Symbol,Status)
   TradeStock(Symbol,BuyOrSell)
   TradePortfolio(BuyOrSell)
   BrokerMessage(Symbol,Side)

512

| Response Name | Listen — 516 | SET Instance — 518 | Expressions — 520, 522 | Move, Create, Delete — 524 | Send — 526 |
|---|---|---|---|---|---|
| one | New(Symbol, Status) | order = Orders(New. Symbol,New.Status) | | create order | |
| two | TradeStock (Symbol,Buy OrSell) | order = Orders (TradeStock.Symbol, "Order_Not_Sent") | order.BuyOrSell = Tradestock. BuyOrSell | move order.Status = "Order_Sent" | Send ("BrokerMessage",order. Symbol,order.BuyOrSell) |
| three | TradePortfolio (BuyOrSell) | order = Orders (*,"Order_Not_Sent") | order.BuyOrSell = TradePortfolio. BuyOrSell | move order.Status = "Order_Sent" | Send ("BrokerMessage",order. Symbol,order.BuyOrSell) |

514

Startup Messages
Type=New,Symbol="IBM",Status="Order_Not_Sent"
Type=New,Symbol="MSFT",Status="Order_Not_Sent"
Type=New,Symbol="XOM",Status="Order_Not_Sent"
Type=TradeStock,Symbol="MSFT",BuyOrSell="SELL"
Type=TradePortfolio,BuyOrSell="SELL"

FIG. 5

| Microsoft Excel | | | | | | |
|---|---|---|---|---|---|---|
| DAP Example | | | | | | |
| Service Declaration | Instance | Initialization Type | Initialization Parameters | | | |
| Service1 | svc | User | | | | |
| Type Declarations | | | | | | |
| string Symbol, string Status, string BuyOrSell, string Side | | | | | | |
| Set Declarations | | | | | | |
| Orders(Symbol,Status) | | | | | | |
| Message Declarations | | | | | | |
| New(Symbol,Status) | | | | | | |
| TradeStock(Symbol,BuyOrSell) | | | | | | |
| TradePortfolio(BuyOrSell) | | | | | | |
| BrokerMessage(Symbol,Side) | | | | | | |
| Response Name | Listen | Set Instance | Expressions | Move, Create, Delete | Send | |
| one | New(Symbol, Status) | order = Orders (New.Symbol,New.Status) | | create order | | |
| two | TradeStock (Symbol,Buy OrSell) | order = Orders (TradeStock.Symbol, "Order_Not_Sent") | order.BuyOrSell = TradeStock. BuyOrSell | move order.Status = "Order_Sent" | Send ("BrokerMessage",order. Symbol,order.BuyOrSell) | |
| three | TradePortfolio (BuyOrSell) | order = Orders (*,"Order_Not_Sent") | order.BuyOrSell = TradePortfolio. BuyOrSell | move order.Status = "Order_Sent" | Send ("BrokerMessage",order. Symbol,order.BuyOrSell) | |
| Startup Messages | | | | | | |
| Type=New,Symbol="IBM",Status="Order_Not_Sent" | | | | | | |
| Type=New,Symbol="MSFT",Status="Order_Not_Sent" | | | | | | |
| Type=New,Symbol="XOM",Status="Order_Not_Sent" | | | | | | |
| Type=TradeStock,Symbol="MSFT",BuyOrSell="SELL" | | | | | | |
| Type=TradePortfolio,BuyOrSell="SELL" | | | | | | |

602 — Service Declaration
604 — Service1 row
606 — Type Declarations
608 — Set Declarations
610 — Response Name
612 — Startup Messages

FIG. 6

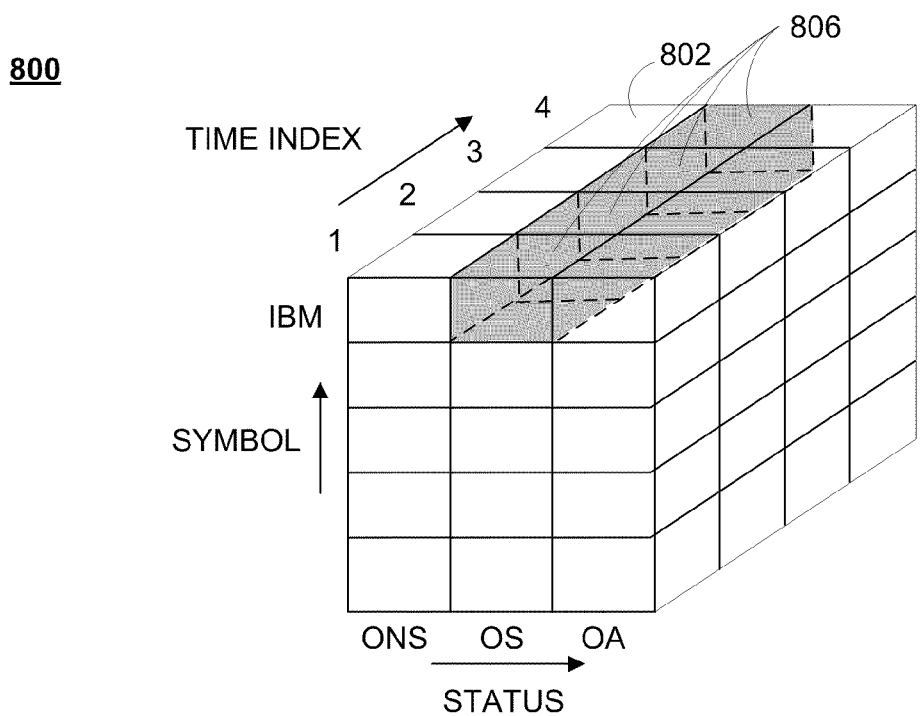
ONS : Order Not Sent
OS  : Order Sent
OA  : Order Acknowledged
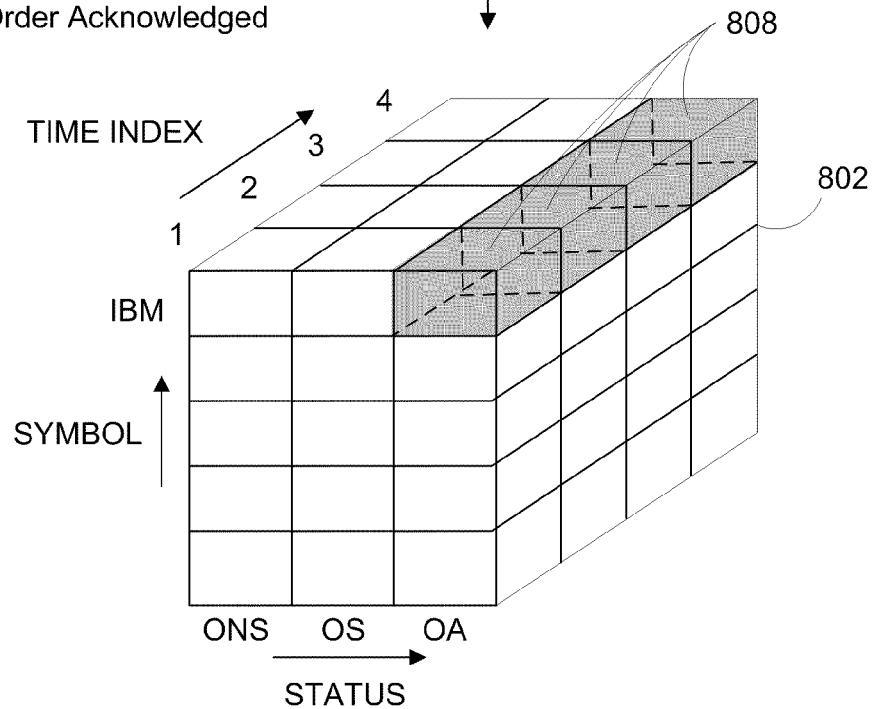
move  (IBM, OS, *) ⟶ (IBM, OA, *)
FIG. 8

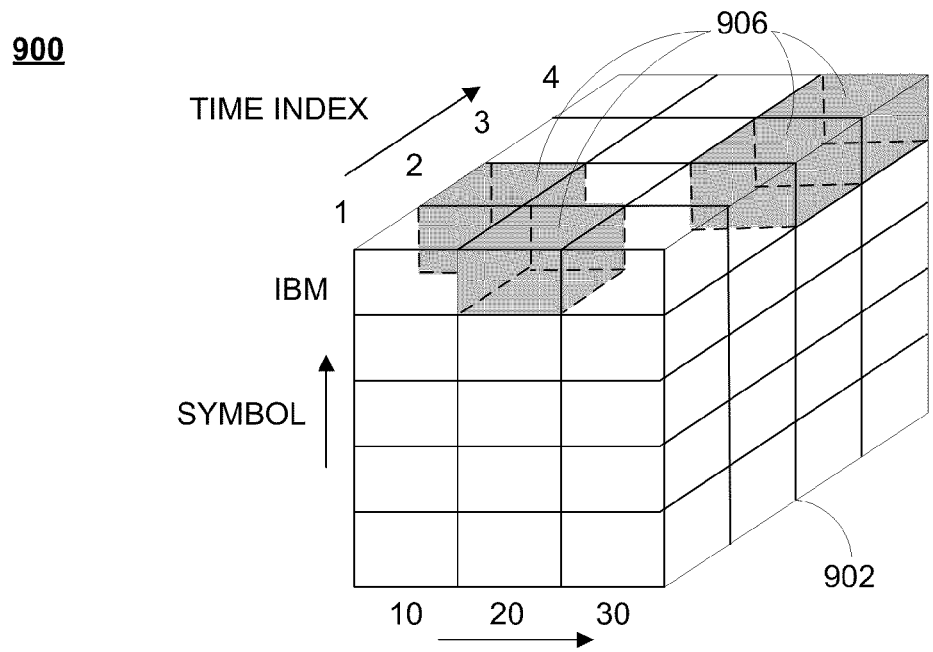
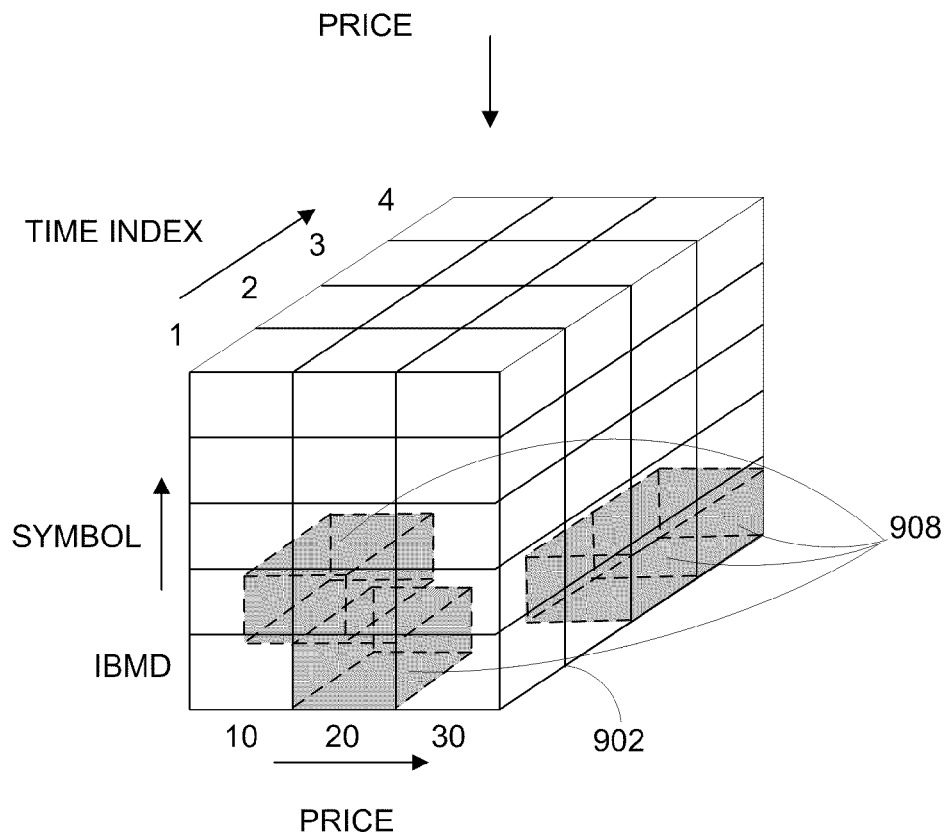
move ( IBM, *, * ) ⟶ (IBMD, *, *)
FIG. 9

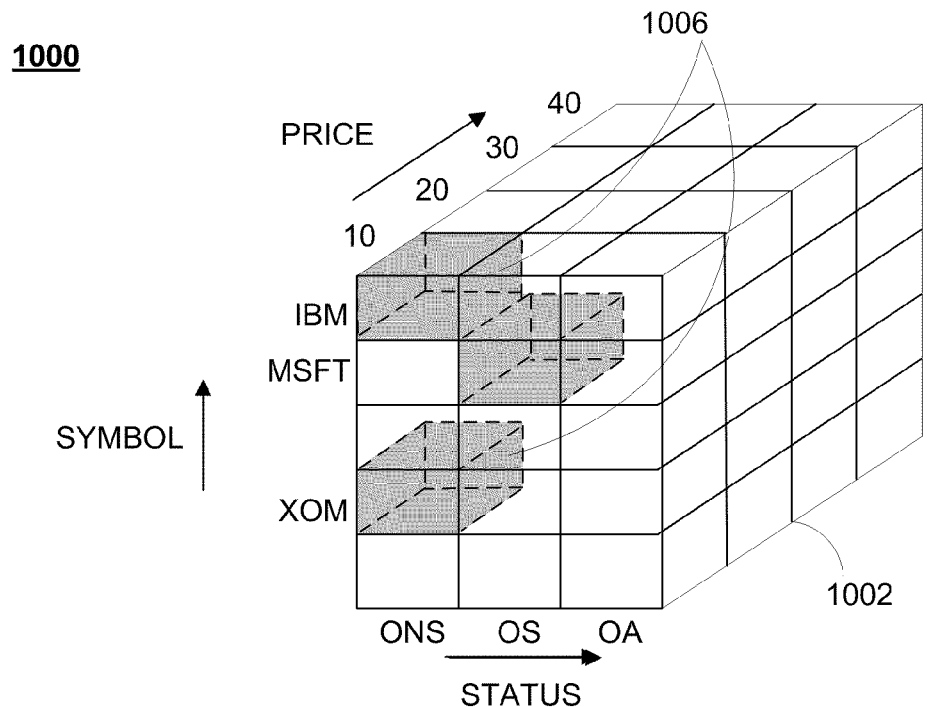
ONS : Order Not Sent
OS : Order Sent
OA : Order Acknowledged
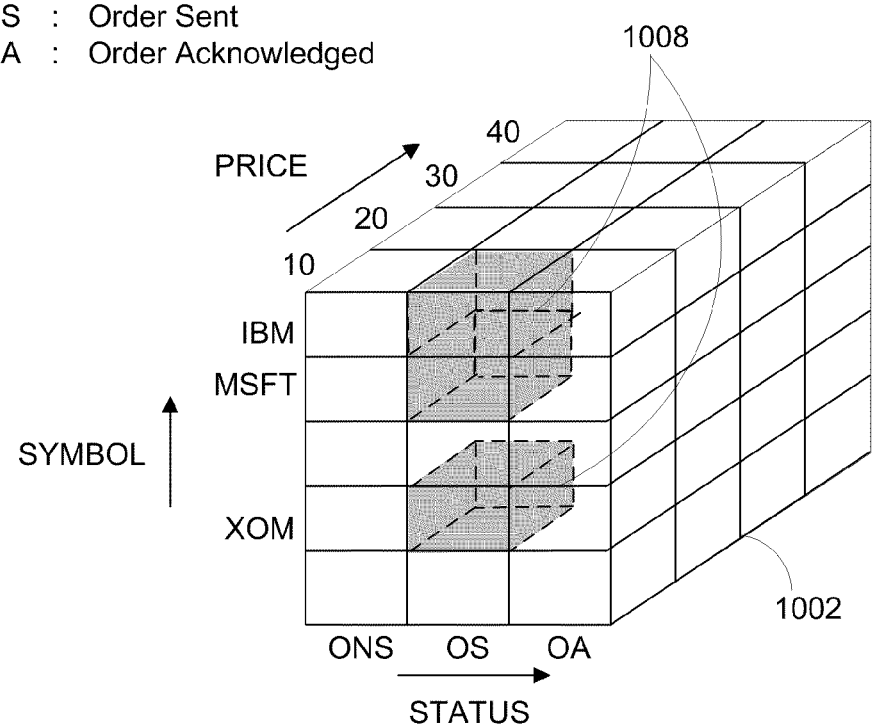
move (*, *, ONS) ⟶ (*, *, OS)
FIG. 10

DimensionValueIndexes hash table

METHOD FOR PERFORMING MESSAGE-BASED DISTRIBUTED COMPUTING, INVOLVES EXECUTING EXPRESSION OF MATCHED MESSAGE RESPONSE ON MEMBERS IDENTIFIED BY SET INSTANCE DEFINITION USING DIMENSION VALUES DERIVED FROM MESSAGE

BACKGROUND OF THE INVENTION

This application generally relates to message-based distributed computing systems and execution of message-based distributed applications on such systems.

Distributed computing systems are typically computer networks where individual computers are in communication with each other, while being physically separated. Each computer may serve as an autonomous computational node, with its own local memory. A single computer running one or more autonomous processes, which interact with each other, where each process may be allocated to run on one or more processor cores, may also be referred to as a distributed computing system. Examples of distributed computing systems include telecommunication networks (e.g., cellular networks), network applications (e.g., peer-to-peer networks), real-time systems (e.g., aircraft control systems), and parallel computation platforms (e.g., grid computing).

Processes in a distributed computing system may communicate with each other via message passing. Traditional message-based systems allow a user to write applications where processes or objects may communicate with other processes via sending and receiving messages. Processes may also wait on messages to synchronize data or execution paths with other processes.

The traditional systems, however, require significant programming effort on the part of the user to write a message-based parallel program. Current parallel programming models hamper user productivity by allowing a user to express parallel constructs at the cost of programming simplicity. Applications that require execution to be real-time, e.g., securities trading systems, require further programming effort on part of the user to offer execution guarantee.

SUMMARY OF THE INVENTION

In view of the foregoing, it would be desirable to provide a distributed message-based computing system for real-time distributed parallel applications. Additionally, it would be desirable to a provide a user with the ability to write message-based distributed parallel applications efficiently.

The present invention provides a Distributed Application Platform (DAP). The DAP architecture is "distributed" because various functions of an application may be performed by processes within a single node, or by processes spread across nodes in a network, or by processes spread across processor cores in a parallel computing environment. In some embodiments, the DAP provides a computing system that executes in real-time and allows for real-time sending and receiving of messages.

Some embodiments of the DAP provide constructs for efficient programming, called sets. A set is a data structure describing an N-dimensional space, where each location in the space is either empty or holds a member. A set allows for quick and easy storage and retrieval of data (stored in members). The location of each member is unique (i.e., a given member does not exist in the set at two locations at once). As a result, a set imposes a high degree of organization on application data. The set construct allows for automatic extraction and processing of one or more members with a single query, without the need for complicated instructions. This makes a set a fast and powerful repository for applications operating on small or large amounts of data.

Applications written for the DAP system may include one or more services, which are containers for units of code (message responses), and associated declarations and definitions (e.g., set declarations). The language of sets is used to direct the flow of execution of a DAP application. A set expresses objects as members, which may be created, moved, or deleted. A DAP application includes units of code, called message responses, that may execute on set members. A set query to a DAP application, specified in a set instance definition of a message response, maps set members to expressions and set operations, to control which program code is executed. The temporal order of messages received by a DAP application determines timing of program code execution.

A message response may call an external code library, which enables manipulation of large amounts of data by the DAP system. A message response may call customized executable code that interfaces with external sources of data such as a relational database, a flat file, or other source of stored data. This allows messages sent to and received from one or more external data sources to be operated on by message responses contained within a DAP application.

In some embodiments, the DAP may be a message-based distributed computing system. The system receives instructions for an application, organized into message responses. Each message response comprises an expression, and a set instance definition to identify members of the set for use by the expression. In some embodiments, the set instance definition declares the set members as a single variable for ease of reference from within the expression. In some embodiments, the set instance definition identifies members of the set using a wild card dimension value. In some embodiments, the message response further comprises a move instruction. The move instruction changes a dimension value of members of the set, and moves the members to new unique locations within the set based on their new dimension values. In some embodiments, the message response further comprises a send instruction. The send instruction causes a message to be sent into the message stream. In some embodiments, the sent message is received by the application and has a matching message response. In some embodiments, the sent message is received by another application having a matching message response.

The system builds the application, and may create a set in memory on initiation of the application. The system may receive an electronic message comprising dimension values, via the networking interface. The system matches the message to a message response, and executes the expression of the matched message response on members of the set identified by the set instance definition. In some embodiments, the message further comprises a scalar value. The expression of the matched message response assigns the scalar value to the scalar property of the members of the set identified by the set instance definition.

In some embodiments, the DAP may be a message-based distributed securities trading system. The system may receive an electronic message comprising quotes and other trading information from a message server, via the network interface. The system may execute expressions to analyze the received messages for effecting trades or other portfolio management functions. Conditional to the outcome of the analysis, the system may send messages effecting securities transactions (e.g., sales and buys) to a trading server. The trading server may be an automated trading system, or may forward incoming transactions to a broker for further review.

In some embodiments, the DAP may comprise a programming interface for writing message-based distributed applications. The programming interface provides a spreadsheet-like display organized into rows and columns. Each row may receive a message response, while corresponding columns may receive listen instructions, set instance definitions, send instructions, and expressions for the message response.

The programming interface may also receive declarations for variable types, messages, and sets referenced in the application.

BRIEF DESCRIPTION OF THE DRAWINGS

The above and other objects and advantages of the invention will be apparent upon consideration of the following detailed description, taken in conjunction with the accompanying drawings, and in which:

FIG. 5 is an illustrative display of a DAP programming interface, in accordance with an embodiment of the invention;

FIG. 6 is an illustrative display of a DAP programming interface, in accordance with another embodiment of the invention;

FIG. 7-10 show examples of different types of query and update operations on a set, in accordance with an embodiment of the invention;

DETAILED DESCRIPTION OF EMBODIMENTS

Figure 1:
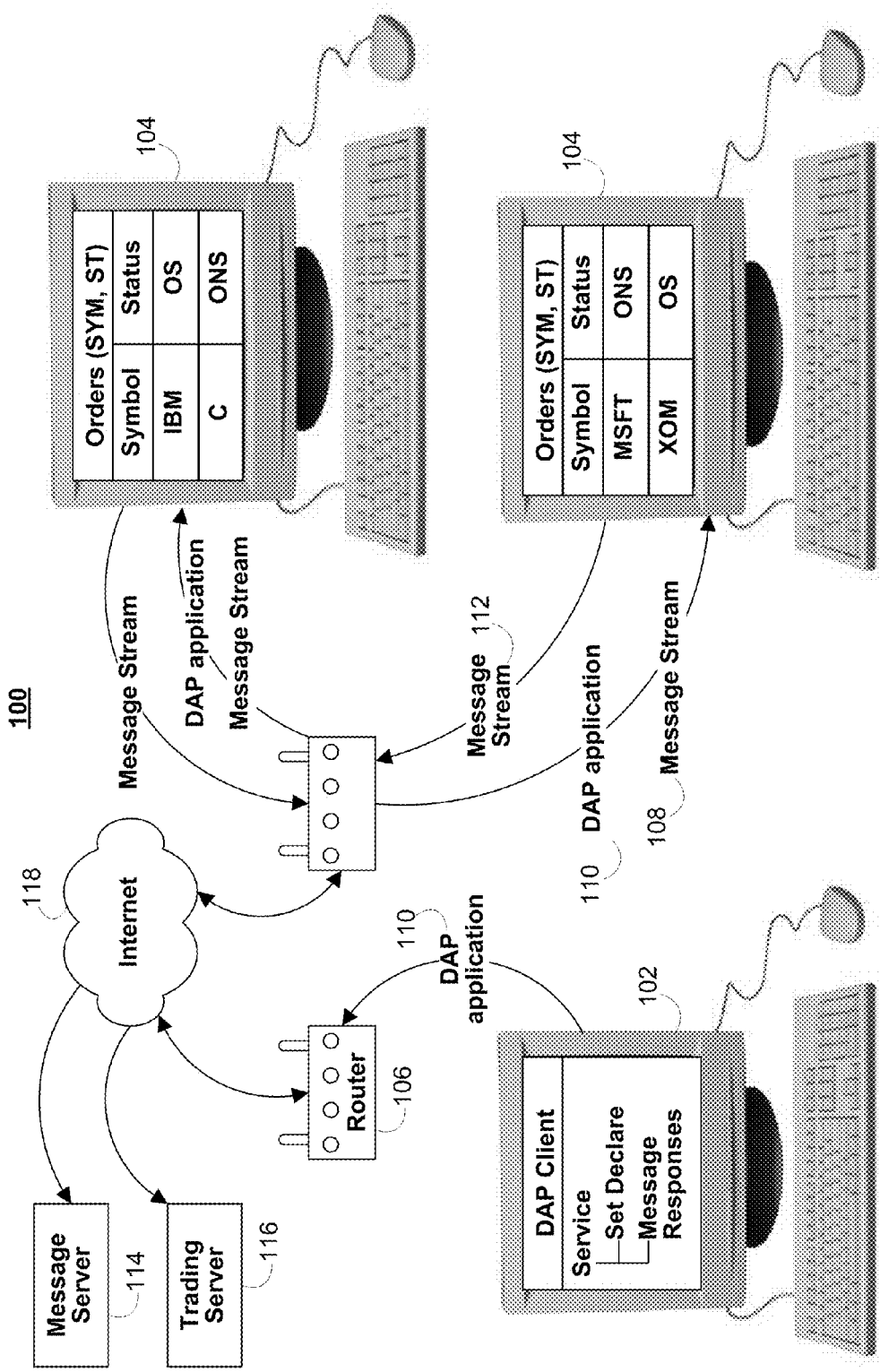
FIG. 1 shows a DAP system, in accordance with an embodiment of the invention.

FIG. 1 shows an illustrative embodiment of DAP system 100. System 100 includes DAP programming equipment 102 and DAP runtime equipment 104, coupled via a network 118. Although a single instance of DAP programming equipment 102, and multiple instances of DAP runtime equipment are shown, there may be single or multiple instances of either equipment as appropriate for the given embodiment. DAP programming equipment 102 provides a programming environment for developing DAP applications. The DAP applications are transmitted over network 118 (e.g., the Internet) to DAP runtime equipment 104. DAP runtime equipment 104 execute the DAP applications on messages received in streams over network 118 from message server 114. In some embodiments, the functionality of DAP programming equipment 102 and DAP runtime equipment 104 may be combined and provided by an instance of equipment (not shown in FIG. 1). DAP programming equipment 102 and DAP runtime equipment 104 may be any suitable MAC or PC based computing system. Network 118 may be any suitable data network, packet data network, circuit switched network, local area network, wide area network, wireless network, public switched telephone network, the Internet, or any other suitable network or combination of networks, capable of electronically exchanging information between a sender and a receiver. Equipment 102 and 104 may connect to the network directly, or via routers 106, or through other suitable communication interfaces.

DAP runtime equipment 104 receives message stream 108 from message server 114 via network 118. Message server 114 provides messages suitable for the intended application. One suitable application includes analyzing messages indicating quotes and other related activity for effecting trades or other portfolio management functions. For purposes of clarity, and not by way of limitation, the embodiments disclosed herein will be discussed in such a context. In the shown embodiment, message server 114 provides real-time quotes via the Internet from service RealTick. DAP may, however, be used in any other suitable context. For example, DAP applications may be used for distributed scientific computing (e.g., physics simulations), market simulations (e.g., historical stock market simulations for use in investment strategy development), market process analysis (e.g., Monte-Carlo simulations for use in risk assessment and development of risk management techniques). DAP applications may be used to solve complex problems through simulation, study, or execution of processes where entity actions and interactions, defined as changes in the state of one or more entities, follow rules that are governed by the location of an entity or entities in an N-dimensional space.

Although only one message server 114 is shown, it may not be in some embodiments the only source of messages in message stream 112. There may be other message servers (not shown). Also, DAP runtime equipment 104 may, under the direction of the DAP application, issue messages into the message stream. These may be messages for execution by one or more of the DAP runtime equipment 104, including the equipment issuing the message, or for execution by non-DAP equipment. In the example of FIG. 1, messages effecting securities transactions (e.g., sales and buys) are sent to trading server 116. Trading server 116 may be an automated trading system, or may forward incoming transactions to a broker for further review.

As will be illustrated and more-fully described below, the DAP architecture is "distributed" because various functions of an entire service may be performed across different instances of runtime equipment 104 (or an instance of combined programming and runtime equipment, not shown in FIG. 1). These functions may run in parallel on different nodes, and then inject their results into the message stream for use by other functions. For example, a function may calculate the standard deviation of given data on one instance of runtime equipment, while another function may calculate the mean of given data in parallel on another instance. These functions inject their results into the message stream, which may be received by another instance of the runtime equipment to calculate a confidence interval.

Figure 2:
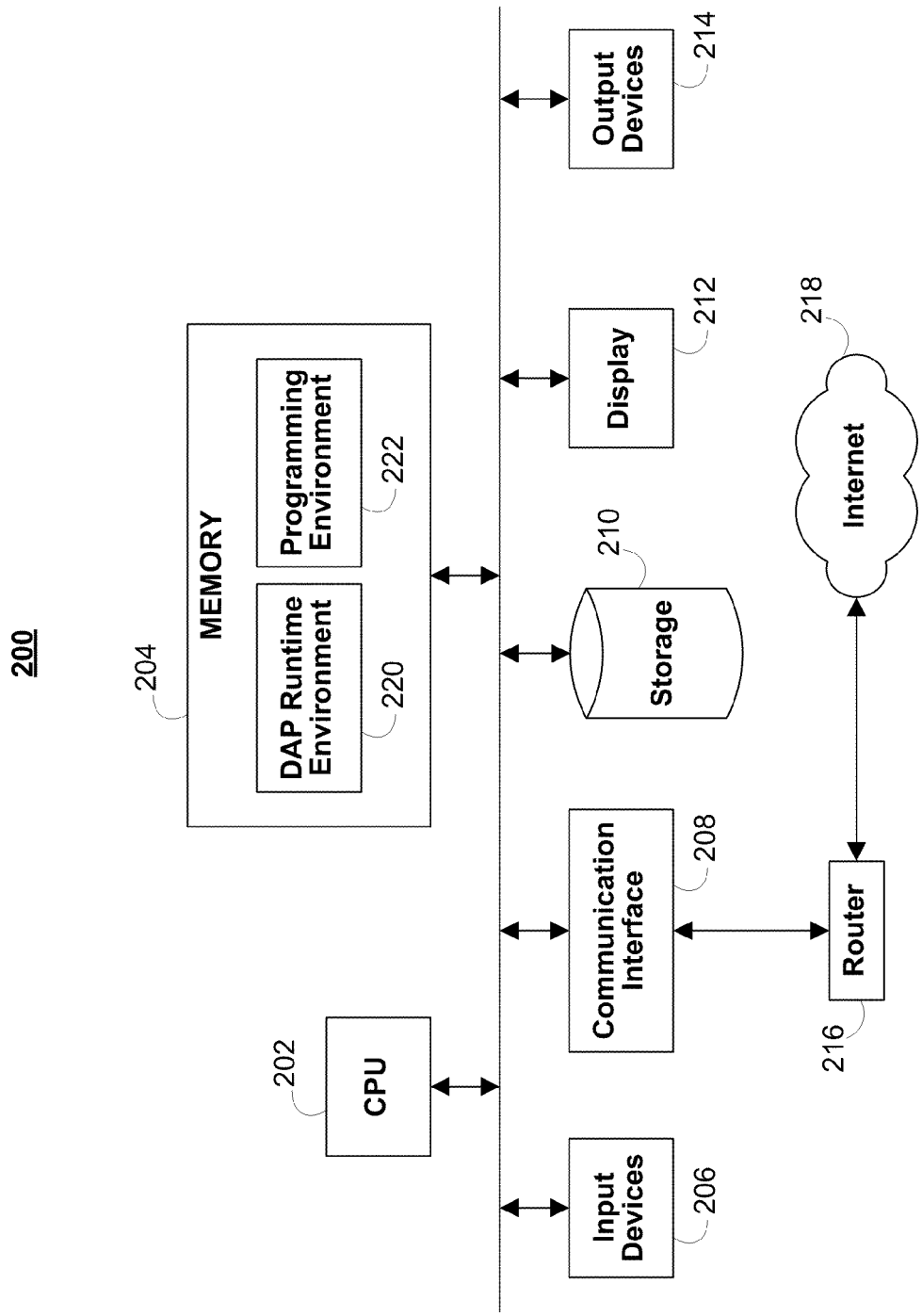
FIG. 2 shows components of a DAP programming equipment, or a DAP runtime equipment, in accordance with an embodiment of the invention.

FIG. 2 illustrates the components of DAP programming equipment, such as 102 of FIG. 1, and DAP runtime equipment, such as 104 of FIG. 1, generally referenced here as equipment 200. Equipment 200 includes central processing unit (CPU) 202, memory device 204, input devices 206, communication interface 208, storage devices 210, display device 212, and output devices 214. Equipment 200 may communicate over network 218, such as the Internet, through the communication interface 208. In this illustrative embodiment, equipment 200 executes both DAP environments. DAP programming environment 222 and runtime environment 220 are a set of computer executable instructions stored in memory 204, storage 210, or other physical computer readable media, and executed by CPU 202. The CPU 202 may be from microprocessor series such as Intel Pentium, Intel Core, Intel Core 2, Intel Xeon, AMD Athlon, AMD Phenom, IBM Power, IBM PowerPC, or other such microprocessor series. Memory device 204 may include read-only (ROM), or random access (RAM) memories, such as a synchronous dynamic random access memory (SDRAM), capable of storing data as well as instructions to be executed by CPU 202. Input devices 206 may include a keyboard, a mouse, a trackball, or other suitable devices. Communication interface 208 may include a network card, a modem, or other suitable devices. Storage 210 may include a hard disk drive (HDD), a flash drive, a floppy drive, a compact disc (CD), a digital versatile disc (DVD), or other suitable fixed or movable computer readable media. Display 212 may include one or more liquid crystal display (LCD) or cathode ray tube (CRT) monitors, or other suitable devices. Output devices 214 may include a projector, a printer, speakers, or other such devices. System 200 may receive and send messages (e.g., message streams 108 and 112) over the network 218 using communication interface 208.

Figure 3:
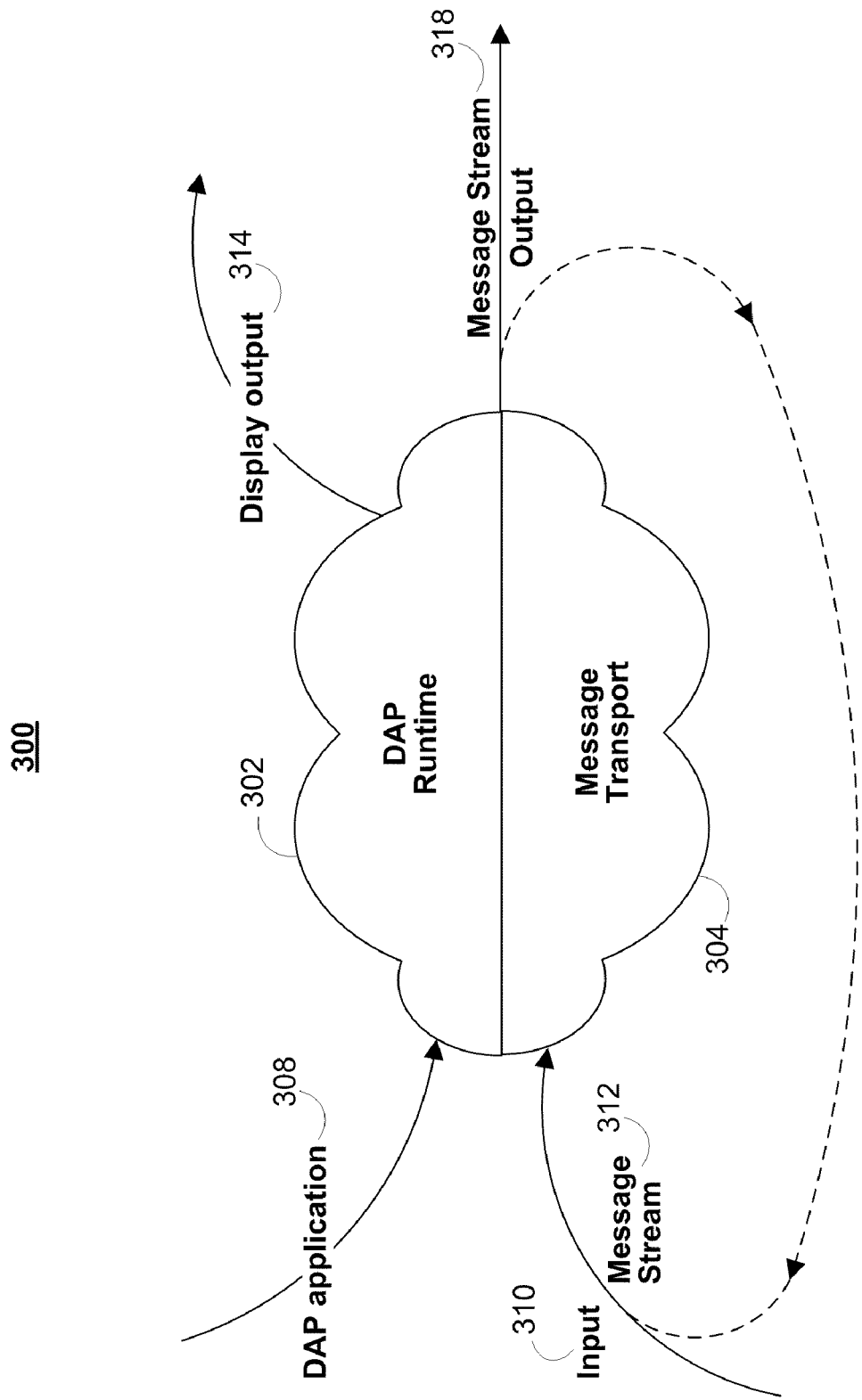
FIG. 3 shows a high-level process-flow diagram of a DAP system, in accordance with an embodiment of the invention.

FIG. 3 illustrates a high-level process-flow diagram of DAP system 300. DAP runtime 302 (which is DAP runtime environment 220 of FIG. 2) is built on Message Transport 304. In some embodiments, Message Transport 304 includes the Concurrency and Coordination Runtime (CCR) and the Decentralized Software Services (DSS) libraries. These libraries are distributed together by Microsoft as a "CCR and DSS toolkit" and provide support for thread concurrency and management. CCR is an asynchronous programming library based on Microsoft .NET framework. The library provides a highly concurrent programming model based on message-passing. DSS sits on top of CCR and provides a light-weight service model for loosely coupled applications. DSS allows applications to run on a single node or be distributed to run across nodes on a network. DAP services send and receive messages via Message Transport 304. DAP application 308 executing in the DAP runtime 302 may receive user input 310, such as startup messages, or message stream 312 from a message server (e.g., message server 114 in FIG. 1). DAP runtime 302 sends data to be displayed via the DAP user interface on Display 314 (e.g., display 212 in FIG. 2). DAP application 308 may generate messages which are sent out as message stream 318 to another server on the network, or to be injected back into the message stream. For example, such a message may include instructions sent to a trading server to sell a security based on its current price.

Figure 4:
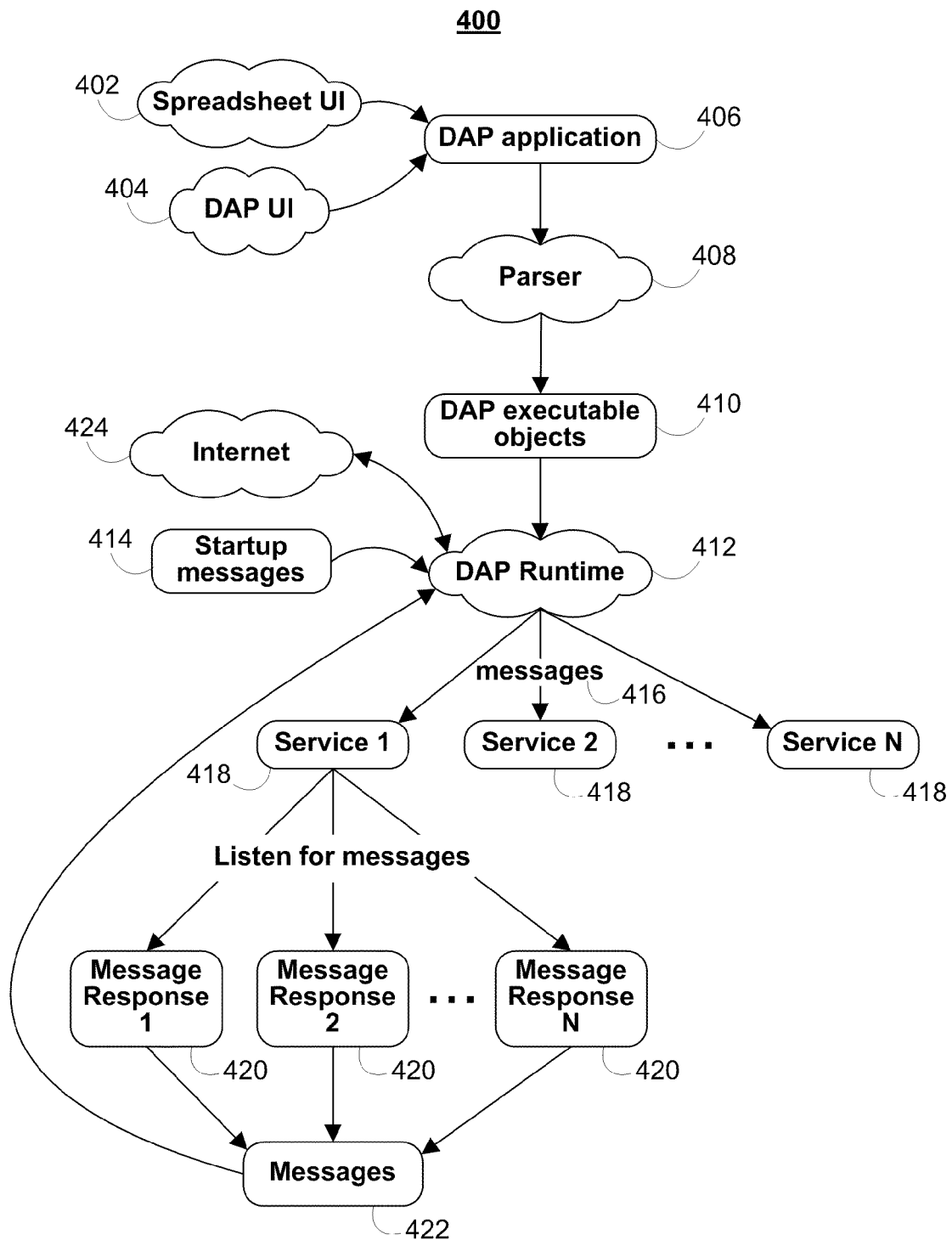
FIG. 4 shows the flow of execution in a DAP system, in accordance with an embodiment of the invention.

FIG. 4 describes the flow of execution in DAP system 400 (or DAP system 300 in FIG. 3). System 400 may receive DAP application code 406 over a network (e.g., network 118 in FIG. 1) from programming equipment (e.g., programming equipment 102 in FIG. 1) as a DAP application file. The user may write the code on programming equipment 102 (FIG. 1) using DAP interface 404 or a spreadsheet program 402. System 400 may receive DAP application code 406 written by a user in DAP user interface 404 or a spreadsheet program 402 running on DAP runtime equipment (e.g., runtime equipment 104 in FIG. 1). Parser 408 reads in DAP application code and builds executable objects and properties 410 which are executable in the DAP runtime 412. DAP runtime receives startup messages 414, or messages from a message server (e.g., message server 114 in FIG. 1) via network 424, which are passed on to Services 418 inside the DAP application. A service is a container for message responses, and associated declarations and definitions (e.g., set declarations). A service, or a group of services, form a DAP application. In embodiments with multiple instances of DAP runtime equipment, a DAP application may have services distributed across runtime equipment. In this example, the communication network is the Internet. Each Service 418 consists of Message Responses 420. Services pass on messages to Message Responses. Each Message Response 420 receives one or more messages 416, executes code based on input field values from each message, and (if part of its function) generates messages 422. The messages may be injected into the message stream for the DAP application, or the messages may be sent to a non-DAP server on the network, such as to a trading server to sell a security based on its current price.

Interfaces for programming DAP applications are shown in FIGS. 5 and 6. FIG. 5 shows DAP programming interface 500, which allows a user to write a DAP application on DAP programming equipment (e.g., programming equipment 102 of FIG. 1) or runtime equipment (e.g., runtime equipment 104 of FIG. 1). Interface 500 is part of DAP's user interface. Subwindow 502 provides the user with a click-to-expand interface to input a DAP program. A DAP program includes one or more Services 504. A service is a container for message responses, and associated declarations and definitions (e.g., set declarations). Each service includes Type Declarations 506, Set Declarations 508, Message Declarations 510, and Message Response Definitions 512. A user may input types (e.g., int, string, double) for input and output variables in Type Declarations 506. A user may declare sets and their dimensions in Set Declarations 508. Generally speaking, a set is a data structure describing an N-dimensional space, where each location in the space is either empty or holds a member. Sets will be described more fully below. In this example, set Orders has dimensions Symbol and Status. This is a declaration only. Set Orders is not allocated in memory until its first use in the application.

In Message Declarations 510, a user may input message declarations for messages that may be received by Service 504 from a message server (e.g., message server 114 in FIG. 1). A message response accepts one or more messages that match its defined message type, and then executes instructions based on input from the fields of the message. Messages may also be generated by DAP Service 504 and transmitted to another server (e.g., trading server 116 in FIG. 1) or injected into the message stream for the DAP application (e.g., message stream 108 in FIG. 1). A message has a name, e.g., New, and fields, e.g., Symbol and Status. The name of the message may also be the type of the message (or the type of the message may be otherwise expressed or implied from the contents of the message).

A user may input message responses, and their input, processing, and output requirements, in Message Response Definitions 512. A message response is a unit of code executed on receipt of a message. A message response may include Response Name 516, Listen instructions 518, Set Instance definition 520, Expressions 522, Move/Create/Delete instructions 524, and Send instructions 526. Listen instructions 518 include one or message types that the message response may receive. In this example, a message of type New with fields Symbol and Status may be received by message response "one" from a message server, while a message of type BrokerMessage may be sent by message response "two" to a trading server.

Set Instance definition 520 includes operations for extracting members from a set to insert into a set instance. A set instance is a collection of members contained within a set. In some embodiments, a Set Instance definition includes operations for running a query on the set to extract members and store them in the set instance. In some embodiments, pointers to members may be stored in the set instance. Expressions 522 include instructions to be executed upon the set instance, and field values from a received message. Move/Create/Delete instructions 524 include instructions for creating, updating, moving, and deleting members within a set. Send instructions 526 include messages to be sent out to an external server, or injected into the message stream for the DAP application (e.g., message stream 108 in FIG. 1). A user may input startup messages in subwindow 514 for the DAP application in subwindow 502. Startup messages initiate execution of the DAP application and may be passed down to appropriate message responses for execution.

FIG. 6 shows another illustrative programming interface, DAP spreadsheet programming interface 600. A user may write a DAP application in a spreadsheet program, such as Microsoft Excel. The DAP application code is saved in a . DAP file, which is an XML file that represent DAP code in an XML format. DAP application code written in Microsoft Excel is imported directly from .XLS or .XLSX format, and transformed into .DAP (XML) format. This .DAP (XML) file is parsed by DAP runtime equipment (runtime equipment 104 in FIG. 1) to construct DAP executable objects. While writing DAP code in a spreadsheet interface, the declarations and definitions are written in a layout similar to that of FIG. 5. First, the DAP program's services are included in Service Declarations 602. Then a user may input Type Declarations 604, Set Declarations 606, Message Declarations 608, and Message Response Definitions 610. Message Response Definitions 610 may include Response Name, and Listen, Set Instance, Expressions, Move/Create/Delete, and Send instructions. A user may input startup messages for the DAP application in Startup Messages 612.

A set is a data structure describing an N-dimensional space, where each location in the space is either empty or holds a member. A member is an object having dimension properties and scalar properties. A set allows for quick and easy storage and retrieval of data (stored in members). Each location in the space is either empty or holds a member. Scalar properties of a member are not associated with any dimension, and may share their value with other members. A scalar property may not be limited to only one value. For example, a scalar property may comprise an array, a list, a struct, a global variable, or a static variable. The location of each member is unique, and is described by the member's dimension properties. Dimension properties are any of the member data that the member may be indexed by. Therefore, multiple members may share one or more dimension values, but not all. As a result, a set imposes a high degree of organization on application data. This allows for member queries based on one or more dimension values, or even when only one or more of the dimensions are specified (using wildcards). Pointers to the extracted members are stored in a set instance. A single operation may be automatically performed on one or more members in the set instance, without the need for additional instructions. This makes a set a fast and powerful repository for programs operating on small or large amounts of data. The set construct offers the ability to create, update, move, or delete multiple members of a set with minimal instructions specified in the message response (e.g., Expressions 522 in FIG. 5). In some embodiments, operations on a member of the set may be performed via a pointer to the member. The order of the dimensions in the set help interpret the meaning of the query. Since the set construct can handle queries with ease, the programmer need not be concerned with array subscripts or pointers to extract data. Each of FIG. 7-10 show examples of different types of query and update operations on a set. Each example shows a set with three dimensions, although other numbers of dimensions may be used.

Figure 7:
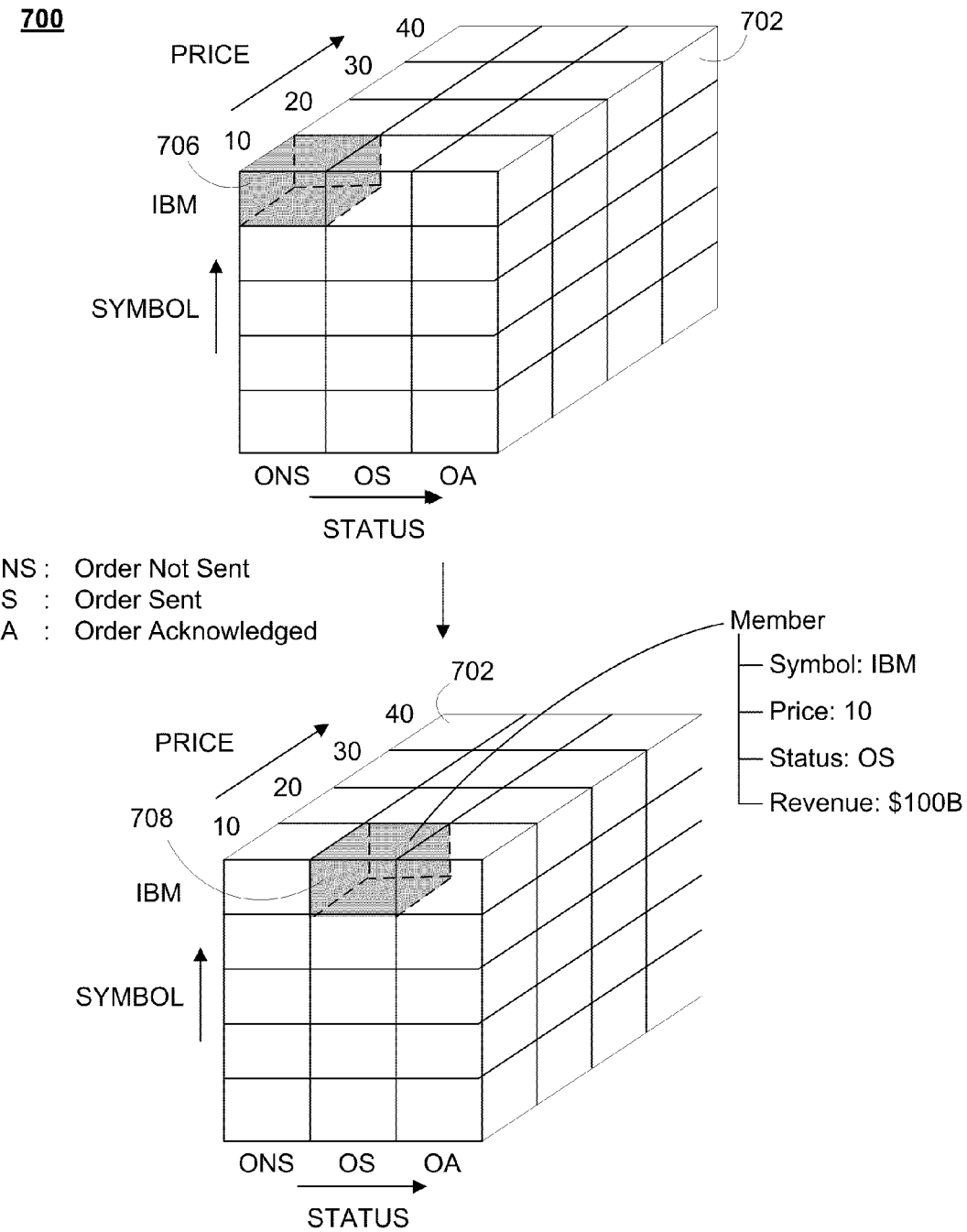

In the example of FIG. 7, set 702 has dimension properties Symbol, Status, and Price, which may be suitable for use in, for example, stock trading systems. Symbol represents a stock symbol, Status represents the stock's order status, such as order sent (OS), order not sent (ONS), or order acknowledged (OA), and Price represents the stock's current price. Set 702 includes a member with dimension properties (IBM, 10, ONS). This member includes a scalar property, Revenue, which is not associated with any dimension. The member is stored at its unique location 706 in the set, as shown shaded in FIG. 7. The member's dimension properties are then updated to (IBM, 10, OS). The update may be the result of a move operation performed by a message response. This update causes the member to be moved to its new unique location 708 (IBM, 10, OS) in the set. If there is an update to any of the dimension properties of a member, it is assigned a new location in the set based on the new dimension properties.

In the example of FIG. 8, set 802 has dimension properties Symbol, Status, and Time Index, suitable for use in, for example, stock trading systems. Symbol represents a stock symbol, Status represents the stock's order status, and Time Index represents the instance in time when the current stock price was obtained. Set 802 includes four members with varying dimension properties. This example illustrates the use of a wild card (*) when operating on a set. Wildcards allow for extraction of pointers to multiple members in a single query. A query such as (IBM, OS, *) requests all members where the first two dimensions hold values IBM and OS. In this example, the query returns pointers to an entire row of members at locations 806 as shown shaded in FIG. 8. The Status dimension of the queried members is then updated to value OA. This update is reflected in each member's dimension properties, and also in each member's location in set 802. The entire row of members is moved to locations 808 to correspond to Status dimension value OA, to preserve the uniqueness of each location based on member dimension properties.

In FIG. 9, set 902 has dimension properties Symbol, Price, and Time Index. Set 902 includes four members with varying dimension properties. This example illustrates the use of more than one wild card (*) when querying a set. A query such as (IBM, *, *) requests all members where the Symbol dimension is IBM. In this example, the query returns all four members with Symbol dimension IBM at locations 906 as shown shaded in FIG. 9. The Symbol dimension of the queried members is then updated to IBMD. This update is reflected in each member's dimension properties, and also in each member's location in the set. All four members are moved to locations 908 to correspond to new Symbol IBMD, to preserve the uniqueness of each location based on member dimension properties.

In FIG. 10, set 1002 has dimension properties Symbol, Status, and Price. Set 1002 includes three members with varying dimension properties. This example also illustrates the use of more than one wild card (*) when querying a set. A query such as (*, *, ONS) requests all members with Status dimension value ONS. In this example, the query returns two members with Status ONS at locations 1006 as shown shaded in FIG. 10. The Status dimension of the queried members is then updated to OS. This update is reflected in each member's dimension properties, and thus in each member's location in the set. The two members are moved to locations 1008 to correspond to new Status OS, to preserve the uniqueness of each location based on member dimension properties.

Figure 11:
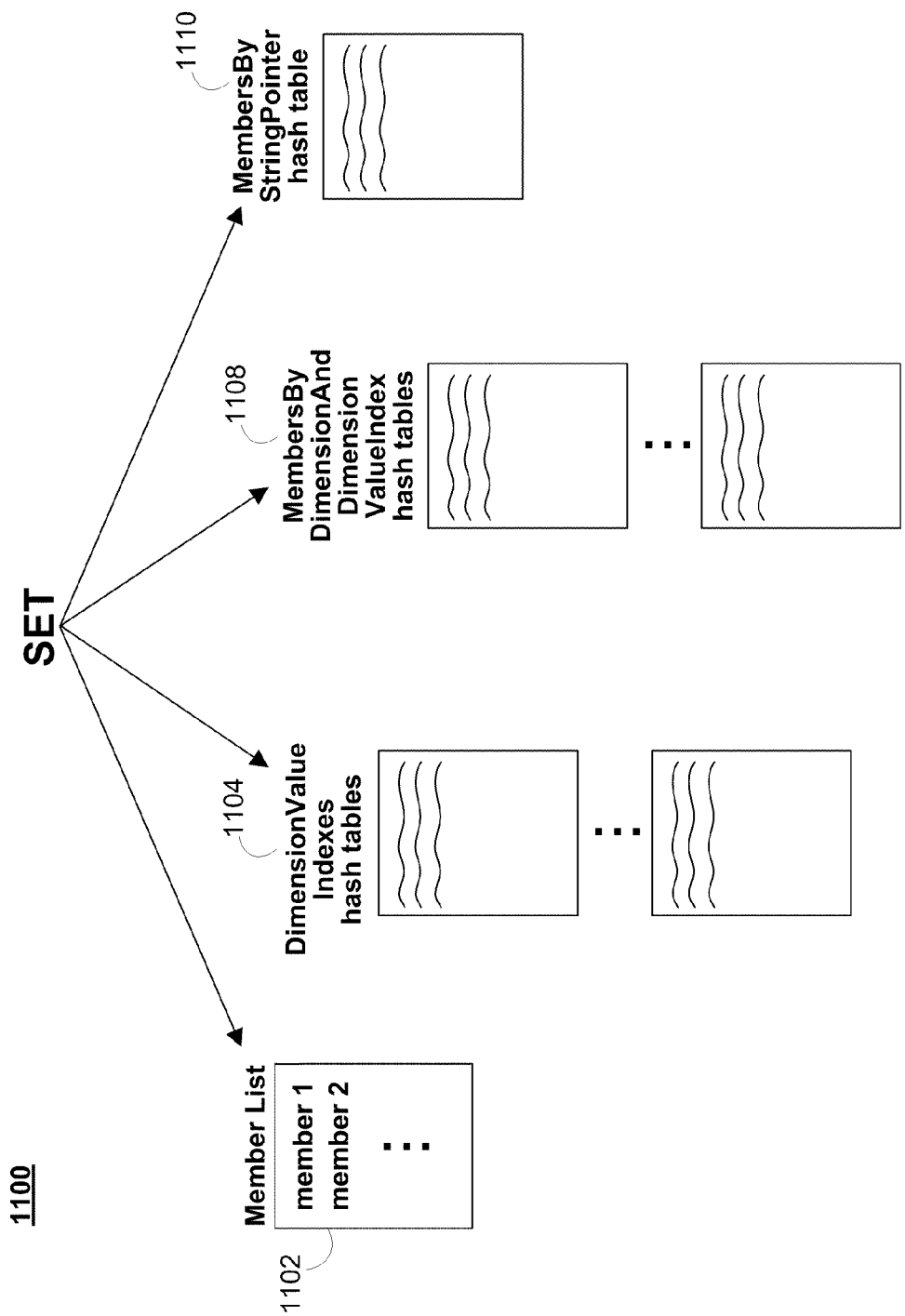
FIG. 11 shows an implementation of a set data structure, in accordance with an embodiment of the invention.

FIG. 11 describes an illustrative embodiment of an implementation of a set data structure. The data structure includes a list of members 1102 in the set, and three kinds of hash tables:
DimensionValueIndexes,
MembersByDimensionAndDimensionValueIndex, and
MembersByStringPointer.

A hash table is a data structure that uses a hash function to efficiently map keys (e.g., value index) to associated values (e.g., dimension value). The hash function transforms a key into the index of an element in the hash table where the corresponding value resides. For a well-designed hash table, the average latency for a lookup, insertion, or deletion, may be independent of the number of entries in the table. Therefore, use of a hash table may allow for constant average latency for each type of operation. Hash tables are created when a set is instantiated in the DAP Runtime Environment 220 (FIG. 2). The N-dimensional structure of a set is embodied in a hash table-based implementation.

Set 1100 may include as many DimensionValueIndexes hash tables 1104 as there are dimensions in the set. For example, a set with three dimensions has three DimensionValueIndexes hash tables. A DimensionValueIndexes hash table for a dimension maps each dimension value to an ordinal index. For example, a set includes three dimensions, Symbol, Price, and Status. Dimension Symbol has dimension values, IBM and MSFT. A DimensionValueIndexes hash table for dimension Symbol may map IBM to value index 0, and MSFT to value index 1. Dimensions Price and Status each have an associated DimensionValueIndexes hash table. One purpose for such hash tables is to reduce the time taken to key into other hash tables. Indexing based on dimension value may be faster when the key used is the assigned ordinal index instead of a string.

Set 1100 may include as many MembersByDimensionAndDimensionValueIndex hash tables 1108 as there are dimensions in the set. These hash tables may be brought into use when a query on one or more specific values within a dimension is encountered, as is the case when a query does not contain a wildcard (*) in every dimension. A hash table for a dimension, accessed via MembersByDimensionAndDimensionValueIndex[Dimension], maps dimension values to members. For example, a set includes two dimensions, Symbol and Price. A set instance creation requests query (IBM, *) to be executed. This query requests all members with Symbol dimension value IBM and any dimension value for Price. Table 1108 is indexed via key ["Symbol"][0] (where value index 0 corresponds to Symbol dimension value IBM), and returns all members with Symbol dimension value IBM and any dimensional value for Price, as requested. A set instance is created that contains members from the set returned as a result of the query.

Set 1100 may include MembersByStringPointer hash table 1110. This hash table is brought in use when a query is submitted with all dimension values known, i.e., no wildcards. Table 1110 is indexed via concatenated value indexes (from DimensionValueIndexes hash tables 1104) corresponding to dimension values for the requested member. For example, a set includes two dimensions, Symbol and Price. A query (IBM, 40) requests a member with Symbol dimension value IBM and Price dimension value 40. Dimension values are first run through the DimensionValueIndexes hash table corresponding to their dimension. The value indexes returned may be 0 for IBM, and 4 for 40. The value indexes are then concatenated together, "0,4", and then used to key into MembersByStringPointer hash table 1110. This step returns a pointer to the member with dimension values (IBM, 40).

Figure 12:
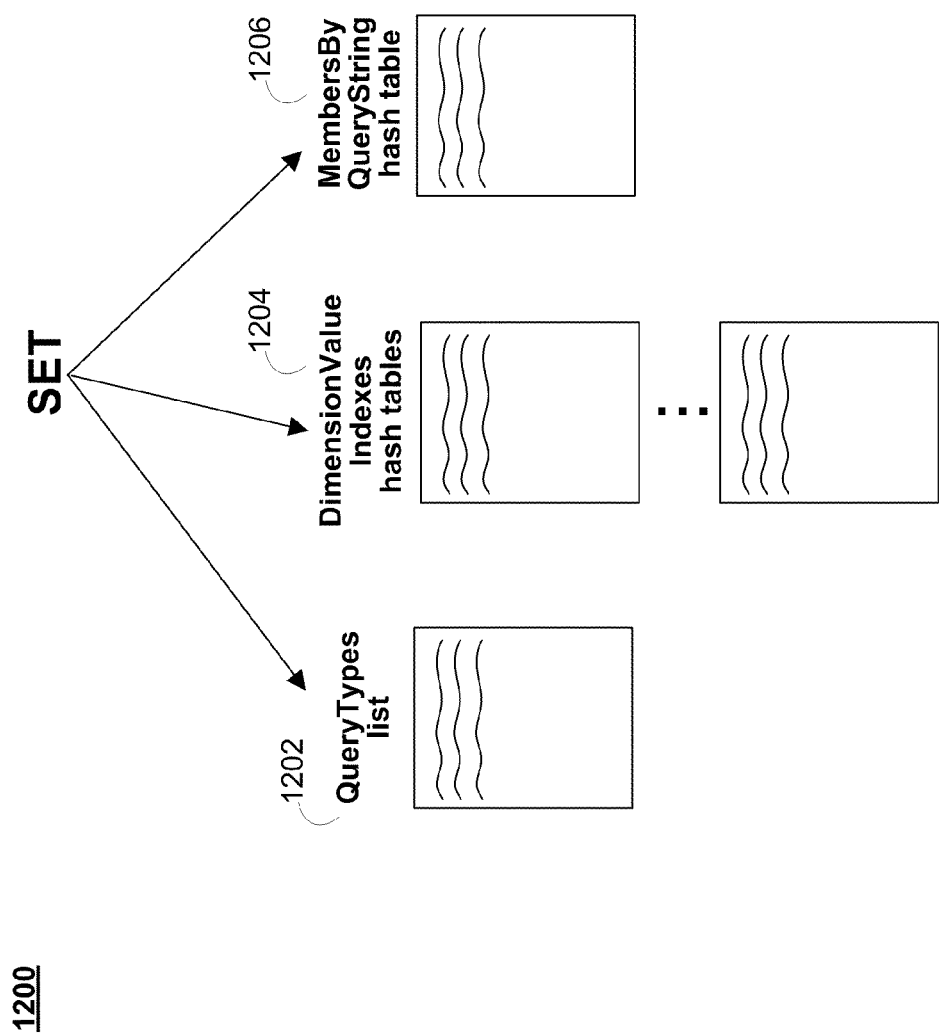
FIG. 12 shows an implementation of a set data structure, in accordance with another embodiment of the invention.

FIG. 12 describes another illustrative embodiment of an implementation of a set data structure. The data structure includes a list QueryTypes, and two kinds of hash tables: DimensionValueIndexes and MembersByQueryString. QueryTypes is created when the DAP application is built. Hash tables are created when a set is instantiated in the DAP Runtime Environment 220 (FIG. 2).

At build time, Set Instance definition 520 (FIG. 5) is inspected for types of queries to be executed on set 1200. For example, query type for query (IBM, *) on a set with two dimensions may be "1,0", where 1 signifies a specified dimension value, and 0 signifies a wildcard. The query types are stored in list QueryTypes 1202, which is used for member storage and retrieval. This embodiment of a set data structure is designed for the case where the number of unique queries types generated by inspecting set queries is significantly less than the total number of possible query types of a set, while considering the number of dimensions of the set. When only a few type of queries need to be executed, it may be more efficient to create a hash table indexed by these few queries rather than creating hash tables for every possible query. For example, a DAP application containing 20 message responses may have four unique query types for a set with 10 dimensions. In this example, four indexes are created. An embodiment of set 1100 with 10 dimensions, each dimension specified with either a value or a wildcard, would require 2^10 indexes. In some embodiments, the decision to use set data structure implementation according to set 1100 or set 1200 may be left to a user. In some embodiments, set data structure implementation according to set 1200 may be only be used if the number of unique queries is under a specified threshold. The threshold may be fixed or configurable by a user.

Set 1200 may include as many DimensionValueIndexes hash tables 1204 as there are dimensions in the set. A DimensionValueIndexes hash table for a dimension maps each dimension value to an ordinal index.

Set 1200 may include MembersByQueryString hash table 1206. Table 1206 is indexed via a concatenated string formed from dimension value indexes (from DimensionValueIndexes hash tables 1204) and query type (from QueryTypes list 1202). For example, a set includes two dimensions, Symbol and Price. A query (IBM, *) requests a member with Symbol dimension value IBM and all possible Price dimension values. This is a query of type "1,0", where 1 signifies a specified dimension value, and 0 signifies a wildcard. Dimension values are first run through the DimensionValueIndexes hash table corresponding to their dimension. The value indexes returned may be 0 for Symbol dimension value IBM, and are not defined for the Price dimension. Since query type specifies a zero for the Price dimension, its value index is denoted as −1. The value indexes are then concatenated together, "0,−1", and this string is used to key into MembersByQueryString hash table 1206. This step returns all members with Symbol dimension value IBM. In this embodiment, all members needed for a query execution may be obtained from a single entry in MembersByQueryString hash table 1206. A query execution does not require any looping or calculating of member intersections between multiple lists to obtain one or more members.

FIG. 13-17 illustrate how different queries on the set are satisfied by a combination of hash tables. These examples show how a DAP program may request members from a set to perform operations, such as move or delete. A set data structure is very versatile, and a query may be molded in any fashion to request members of interest in the set. This is facilitated by the location-based nature of a set, i.e., each member has a unique location in the set.

Figure 13:
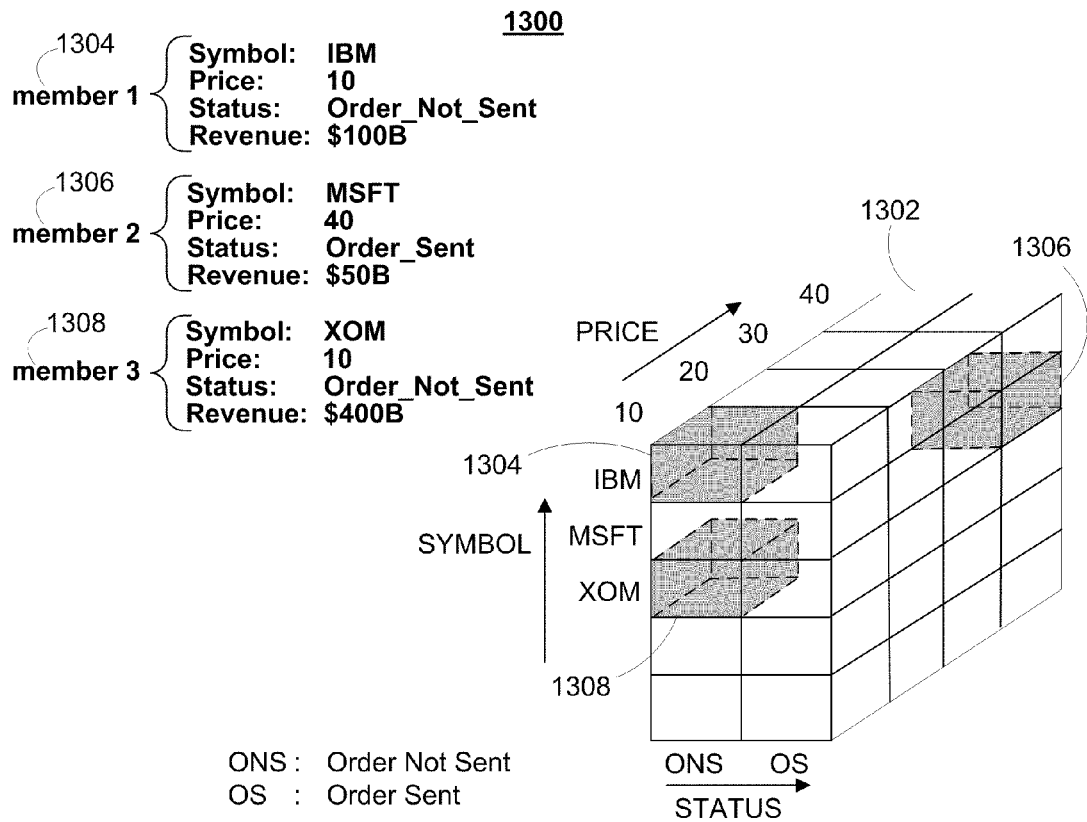
FIG. 13-17 shows different queries on a set being satisfied by a combination of hash tables, in accordance with an embodiment of the invention.

FIG. 13 shows set 1302 with three dimensions, Symbol, Price, and Status. Members may also have scalar properties, e.g. Revenue, that are not associated with any dimension. The set has three members, 1304, 1306, and 1308, each in its unique location in the set.

Figure 14:
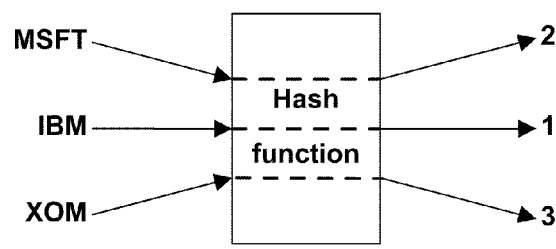

FIG. 14 shows one of three DimensionValueIndexes hash tables for set 1302. Each dimension has a corresponding DimensionValueIndexes hash table. Hash table 1400 for dimension Symbol maps strings to ordinal value indexes. For example, Symbol dimension value MSFT maps to value index 2. Similarly, the other two hash tables map Price and Symbol dimension values to their respective value indexes. These value indexes are then used to retrieve set members from other hash tables in the set data structure. Mapping strings to ordinal indexes reduces the size of the hash key passed to other hash tables, and helps speed the lookup process of a hash table. This is especially useful if the set has a large number of dimensions.

Figure 15:
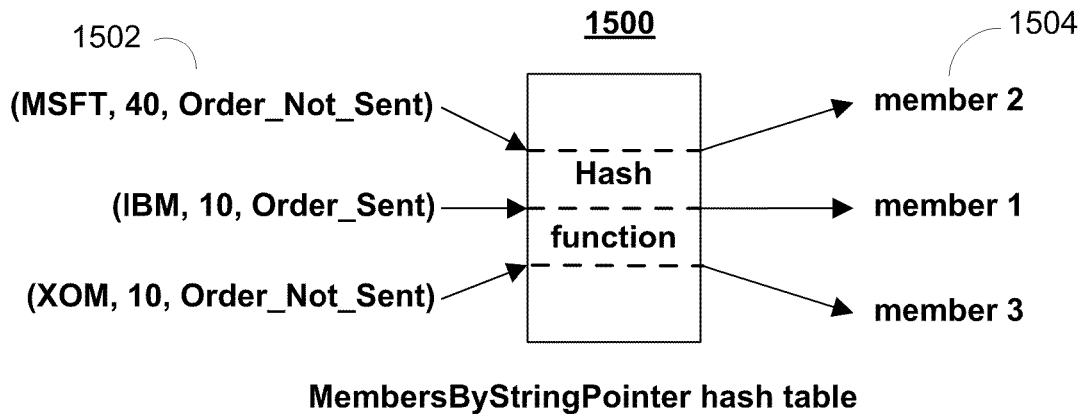

FIG. 15 shows MembersByStringPointer hash table 1500 which is used for queries on a set where all dimension values are known. Query 1502 on hash table 1500 retrieves member 1504 from set 1302. In order to complete the query, value indexes taken from DimensionValueIndexes hash tables are concatenated into a string. This string is used to map into hash table 1500 to retrieve member 1504. Similarly, the other two queries are converted to concatenated value indexes, and corresponding members are retrieved from the set.

Figure 16:
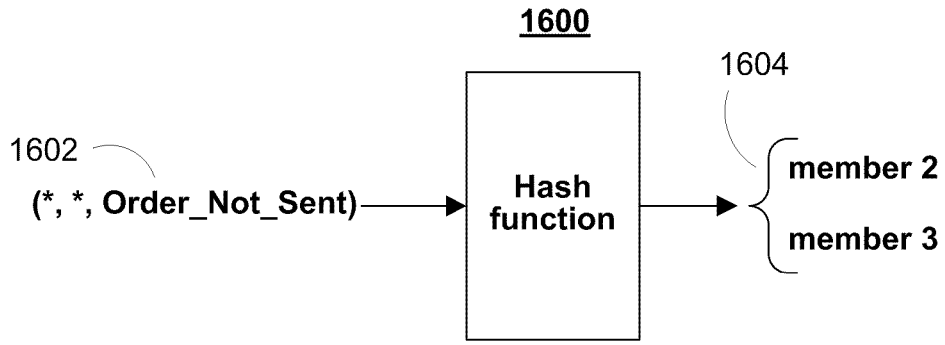

FIG. 16 shows an example of a query with wildcards, and use of MembersByDimensionAndValueIndex hash tables. Query 1602 requests all members in set 1302 with Status dimension value, "Order_Not_Sent". First, the corresponding value index for status "Order_Not Sent" is retrieved (e.g., 1) from DimensionValueIndexes hash table for dimensions Status. Table 1600 corresponds to dimension Status and value index 1. The index is used to map into hash table 1600, and retrieve members 1604 to satisfy the query. This helps illustrate the power of a set, which has a highly organized structure enabling concise queries to quickly extract multiple members from a set based on any dimension property.

Figure 17:
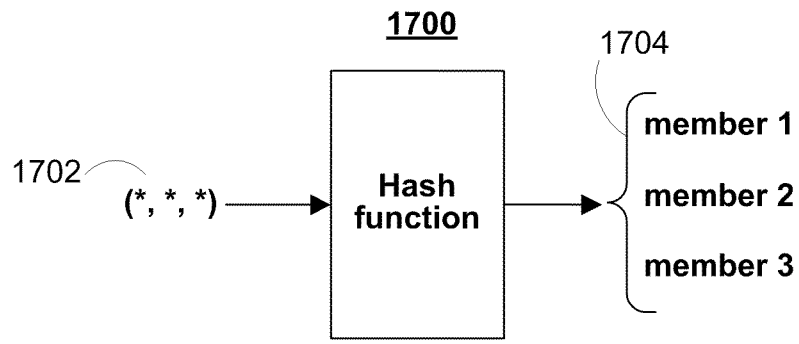

FIG. 17 shows an example of an all wildcard (*,*,*) query on set 1302. This query requests all members in set 1302. Table 1700 is indexed by dimension, and an entry in the hash table contains all members corresponding to a particular dimension. Table 1700 has three entries (since set 1302 has three dimensions), and any of the three entries may be used to retrieve all members of set 1302. Such a query may be useful when a global update needs to be applied to all members in a set.

Figure 18:
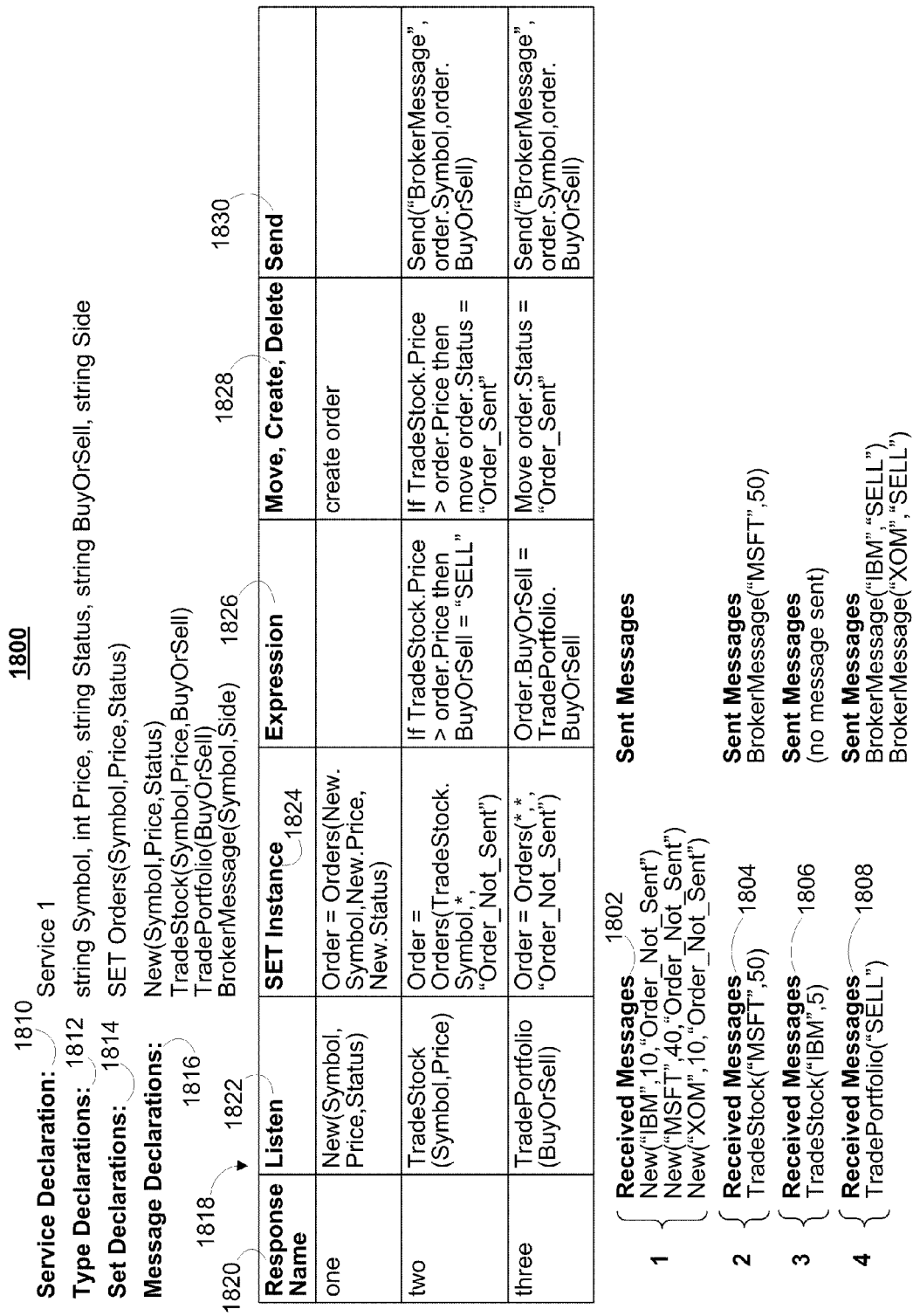
FIG. 18 shows a fully functional example of a DAP program, in accordance with an embodiment of the invention.

A DAP program executes message responses corresponding to received messages, and operates on one or more sets to obtain and store data. FIG. 18 shows a fully functional example of a DAP program. Program 1800 includes Service Declarations 1810, Type Declarations 1812, Set Declarations 1814, Message Declarations 1816, and Message Response Definitions 1818. Message Response Definitions 1818 may include Response Name, and Listen, Set Instance, Expressions, Move/Create/Delete, and Send instructions.

A message response executes a unit of code upon receipt of an appropriate message and may generate one or more messages to be sent out. An appropriate message matches the message type specified in the Listen section of the message response definition. In program 1800, we look at message response "two" as an example to illustrate different sections of a message response definition. Message response "two" may receive messages of type TradeStock, as defined in Listen instructions 1822. If such a message is received, response "two" executes instructions to populate set instance order, as defined in Set Instance definition 1824. The set instance definition includes operations for running a query on the set Orders, extracting pointers to members matching Symbol value TradeStock.Symbol (taken from message type TradeStock), any Price value, and Status value "Order_Not_Sent", and storing them in set instance order. Instructions included in Expressions 1826 update field BuyOrSell in set instance order. Expressions 1826 may include other instructions as well, e.g., for calculating average or standard deviation. Instructions in Move/Create/Delete instructions 1828 update member Status of set instance order to "Order_Sent". Move/Create/Delete instructions may also create or delete sets, or create, move, or delete members within a set. Send instructions 1830 include instructions for sending a message of type BrokerMessage with fields order.Symbol and order.BuyOrSell.

Program 1800 receives four sets of messages during the course of its execution. On receipt of messages 1802, set Orders is created, and three new members are added to set Orders. On receipt of message 1804, a decision is made to sell MSFT and a message to sell is sent out. On receipt of message 1806, no decision to sell IBM is made, and no message is sent out. On receipt of message 1808, the unsold portion of the portfolio (MSFT, XOM) is considered, and messages to sell the remaining stocks is sent out. The following paragraphs discuss execution of the received messages in detail.

Messages 1802 are all of type New, and are passed to message response "one" for execution by service Service1. We look at the first message, New ("IBM", 10, "Order_Not_Sent"), to illustrate execution of a message by a message response. Message response "one" listens for messages of type New. On receipt of this message, set Orders is created, and a member with dimension values (IBM, 10, Order_Not_Sent) is inserted into set Orders. Similarly, members with Symbol dimension value "MSFT" and "XOM" are added to set Orders on receipt of corresponding New messages. Message response "two" listens for message type TradeStock. Message 1804 of type TradeStock is received and passed to message response "two" for execution. A set instance order is created with members corresponding to Symbol dimension value "MSFT" and Status dimension value "Order_Not_Sent". Message response "two"'s Expression is executed, and property BuyOrSell is updated to "SELL". Set Orders is updated based on the outcome to reflect "Order_Sent" for selling this stock. Message response "two" then sends a message of type BrokerMessage with field values "MSFT" and "SELL" to a trading server (e.g., trading server 116 in FIG. 1).

Another message 1806 of type TradeStock is received by message response "two", a set instance is created with members corresponding to dimension values IBM, no decision to "SELL" is made, no updates to set Orders are made, and no messages are sent out. Lastly, message 1808 of type TradePortfolio is received by service Service1, and is passed to message response three. Message response three creates a set instance with members corresponding to Status dimension value "Order_Not_Sent", which yields members with dimension values (IBM, 5, Order_Not_Sent) and (XOM, 10, Order_Not_Sent). Message response "three" Expression is executed and property BuyOrSell is updated to "SELL". Set Orders is updated to reflect Status "Order_Sent" for these two members. Message response "three" then sends a message of type BrokerMessage for each member with member Symbol value and "SELL" string as field values.

Figure 19:
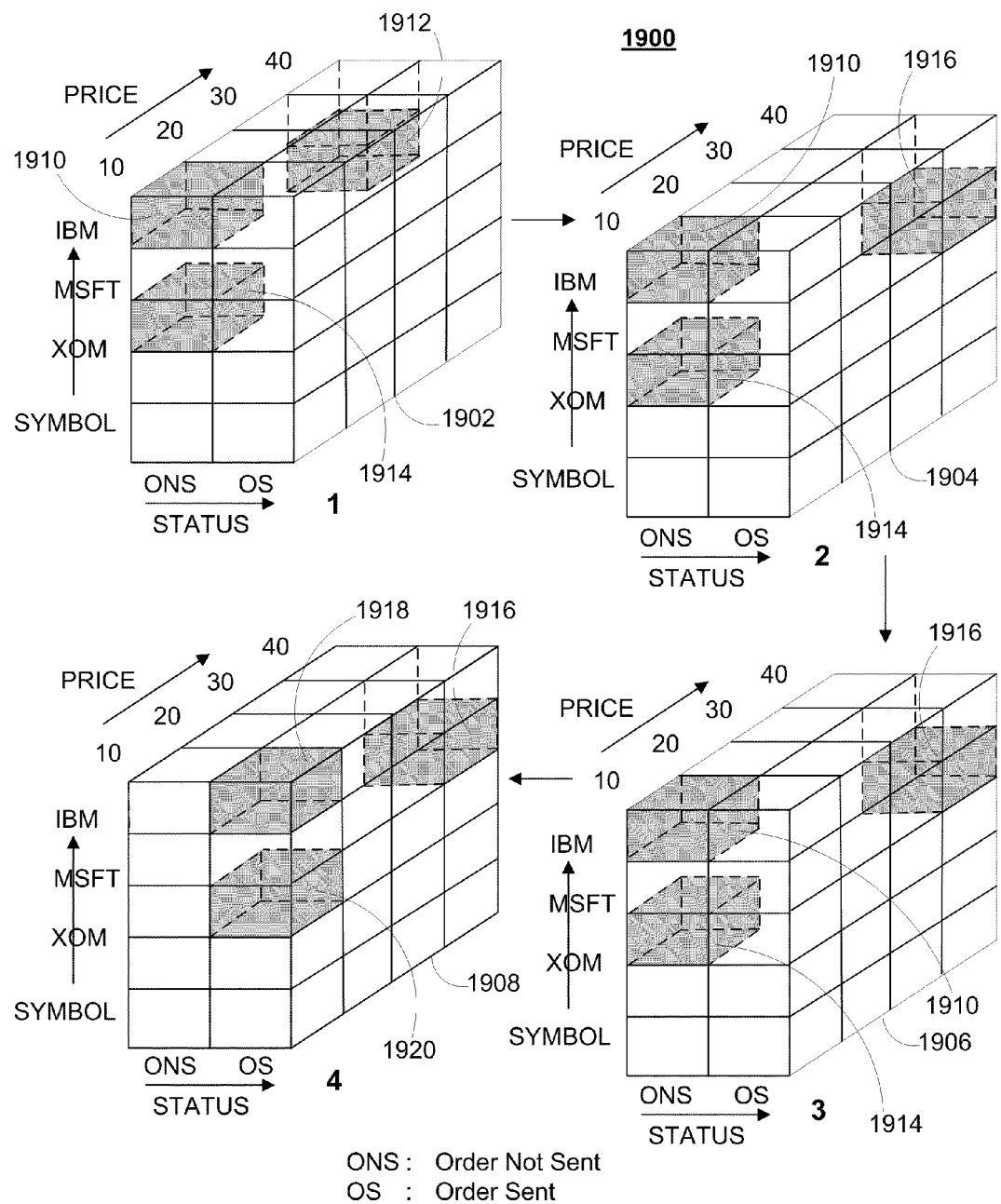
FIG. 19 shows how a set is created and modified as each message is executed, in accordance with an embodiment of the invention.

FIG. 19 shows how set Orders from program 1800 is created and modified as each message is executed. Operations performed in program 1800 include set creation, member creation, and member move. On receipt of messages 1802, set Orders 1902 is created, and members are created and inserted at locations 1910, 1912, and 1914 in the set. On receipt of message 1804, a decision to sell MSFT is made and its member Status property is updated to "Order_Sent". As a result, the member moves from location 1912 to location 1916 in the set. On receipt of message 1806, the member at location 1910 is brought under consideration, but no changes to the set are made. On receipt of message 1808, a decision to sell IBM and XOM is made, and their member Status properties are updated to "Order_Sent". The members move from set locations 1910 and 1912 to 1918 and 1920, respectively. The location-based nature of a set keeps the data highly organized, such that any type of query on any of the set dimensions can be accomplished with ease. This also makes programming for the DAP system very easy, requiring minimal instructions to update all set members in consideration (e.g., instructions in Expressions 1826 in FIG. 18).

Table 1 below shows an illustrative example of a DAP program for trading equities.

TABLE 1

| DAP Trading Application | | | |
| --- | --- | --- | --- |
| Service Declaration | Instance | Initialization Type | Initialization Parameters |
| TraderService | traderSvc | User | |

Type Declarations string Symbol, int SideInt, int Qty, double LmtPrice, string OrderID, double Price,
datetime Time, string OrderStatus, string ActiveStatus, int QtyRemain, int QtyFilled,
string Status, double LmtPriceLast, bool CancelOrder, bool PlaceOrder, int
OrderSideInt, int OrderQty, int QtyLast, string Side Set Declarations Orders(Symbol, OrderStatus, ActiveStatus)

Message Declarations

Pricing_Quote(Symbol, Price)
Strategy_Order(Symbol, Side, Qty)
Broker_Fill(Symbol, Side, Qty, Price)
Broker_OrderStatus(Symbol, OrderID, Status)
Trader_PlaceOrder(Symbol, Side, Qty, LmtPrice)
Trader_CancelOrder(OrderID)
Strategy_Init(Symbol)
User_TradeControl(Symbol, ActiveStatus)

| RN | Listen | Set Instance | Expressions | Move, Create, Delete | Send |
| --- | --- | --- | --- | --- | --- |
| R1 | Strategy_Init(Symbol) | m = Orders(Strategy_Init.Symbol, "NotSent", "Stopped"); | | Create m | |
| R2 | Strategy_Order (Symbol, Side, Qty) | m = Orders(Strategy_Order.Symbol, "NotSent", "Stopped"); | m.Side = Strategy_Order.Side; m.Qty = Strategy_Order.Qty; m.QtyRemain = Strategy_Order.Qty; | | |

TABLE 1-continued

DAP Trading Application

| | | | | | |
|---|---|---|---|---|---|
| R3 | Pricing_Quote(Symbol, Price) | m = Orders(Pricing_Quote.Symbol, "Canceled", "Started"); | | Move m.OrderStatus = "NotSent"; | |
| R4 | Pricing_Quote(Symbol, Price) | m = Orders(Pricing_Quote.Symbol, "NotSent", "Started"); | m.LmtPrice = PricingQuote.Price; | Move m.OrderStatus = "Sent"; | Send("Trader_Order", m.Symbol, m.Side, m.Qty, m.LmtPrice); |
| R5 | Pricing_Quote(Symbol, Price) | m = Orders(Pricing_Quote.Symbol, "Acknowledged", "Started"); | m.LmtPriceLast = m.LmtPrice; m.LmtPrice = Pricing_Quote.Price; | Move m.OrderStatus = if (m.LmtPriceLast != m.LmtPrice, "CancelNotSent", m.OrderStatus); | |
| R6 | Pricing_Quote(Symbol, Price) | m = Orders(Pricing_Quote.Symbol, "CancelNotSent", "Started"); | m.LmtPriceLast = m.LmtPrice; m.LmtPrice = Pricing_Quote.Price; | Move m.OrderStatus = "Cancel"; | Send("Trader_CancelOrder", m.OrderID); |
| R7 | Pricing_Quote(Symbol, Price) | m = Orders(Strategy_Init.Symbol, "Acknowledged", "Stopped"); | | Move m.OrderStatus = "Cancel"; | Send("Trader_CancelOrder", m.OrderID); |
| R8 | User_TradeControl (Symbol, ActiveStatus) | m = Orders(User_TradeControl.Symbol, *, *); | | Move m.ActiveStatus = User_TradeControl.ActiveStatus; | |
| R9 | Broker_Fill(Symbol, Side, Qty, Price) | m = Orders(Broker_Fill.Symbol, *, *); | m.QtyFilled = m.QtyFilled + Broker_Fill.Qty; m.QtyRemain = m.Qty − m.QtyFilled; | | |
| R10 | Broker_OrderStatus (Symbol, OrderID, Status) | m = Orders(Broker_OrderStatus.Symbol, *, *); | m.OrderID = Broker_OrderStatus.OrderID; | Move m.OrderStatus = Broker_OrderStatus.Status; | |
| R11 | Broker_OrderStatus (Symbol, OrderID, Status) | m = Orders(Broker_OrderStatus.Symbol, "Canceled", "Started"); | | Move m.OrderStatus = "NotSent"; | |
| Startup Messages | | | | | |

Type=Strategy_Init, Symbol="IBM"
Type=Strategy_Init, Symbol="IBM", Side="BUY", Qty=1000
Type=User_TradeControl, Symbol="IBM", ActiveStatus="Started"
Type=Pricing_Quote, Symbol="IBM", Price=123.34
Type=Broker_Fill, OrderID=57, Symbol="IBM", Side="BUY", Qty=200, Price=123

Figure 20:
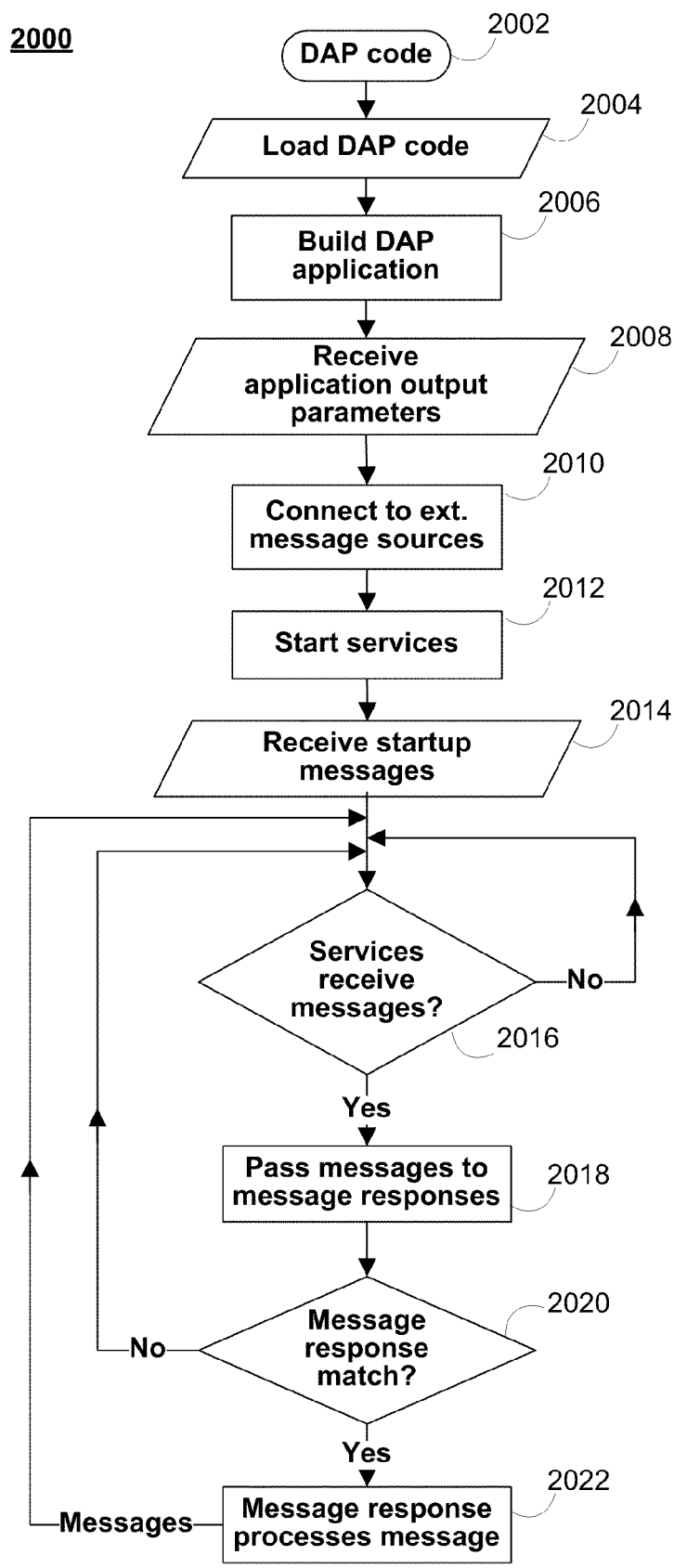
FIG. 20 shows a flow diagram on the operation of the DAP system, in accordance with an embodiment of the invention.

FIG. 20-26 show illustrative flow diagrams on the operation of the DAP system. The flow diagrams include operations during loading, parsing, building, and running of a DAP application. FIG. 20 shows a general overview of the system, while FIG. 21-26 focus on certain portions of functionality of the DAP system, and operations for implementing that functionality in an illustrative embodiment.

FIG. 20 shows illustrative flow diagram 2000 for loading, building, and running a DAP application when it is received by the DAP system. At 2004, CPU 202 (FIG. 2) may receive DAP application code 2002 via network 218 (FIG. 2), and load it into DAP runtime environment 220 (FIG. 2) residing in memory 204 (FIG. 2). DAP application code 2002 may be written by a user in either DAP programming interface 500 (part of programming environment 222 (FIG. 2) residing in memory 204 (FIG. 2)) or spreadsheet programming interface 600. DAP application code 2002 may have been written on either programming equipment (e.g., programming equipment 102 in FIG. 1) or runtime equipment (e.g., runtime equipment 104 in FIG. 1), or equipment that provides both programming and runtime functionality.

At 2006, CPU 202 (FIG. 2), under instructions of DAP runtime environment 220 (FIG. 2), builds a DAP application by parsing DAP application code 2002 and creating executable objects from the parsed code. The DAP application is ready for execution at the end of 2006. An illustrative embodiment of further operations involved in 2006 is described below in FIG. 21.

At 2008, CPU 202 (FIG. 2) receives application output parameters specified by the user via one or more input devices 206 (FIG. 2), or via network 218 (FIG. 2). The application output parameters specify a set to be displayed on Display 212 (FIG. 2) or one or more output devices 214 (FIG. 2). Displaying the set includes displaying members of the set, and their respective dimension properties, dimension values, scalar properties, and scalar values.

At 2010, CPU 202 (FIG. 2), running under instructions of the DAP runtime environment, calls the DAP application Start method, and connects to an external message source (e.g., message server 114 in FIG. 1) as required by the DAP application. In some embodiments, there may be multiple message servers. A message server provides messages suitable for the DAP application, e.g., real-time quotes for a securities trading DAP application.

At 2012, CPU 202 (FIG. 2) starts DAP application services. Services contain set declarations, and message responses that may execute on received messages. Services in the DAP application receive and process startup messages to pass on to message responses.

At 2014, CPU 202 (FIG. 2) receives startup messages to initiate execution of the DAP application. Startup messages may be input by a user in DAP equipment (e.g., subwindow 514 in FIG. 5) via one or more input devices 206, or received via a message stream (e.g., message stream 108 in FIG. 1) over network 218 (FIG. 2). The messages may be passed down by DAP application services to appropriate message responses for execution.

At 2016, if one or more messages are received from 2014, services pass on the messages to their message responses in 2018. If no message is received at this time, the DAP runtime loops back to 2016 and listens for messages.

At 2020, CPU 202 (FIG. 2) matches received messages to their corresponding message responses. Each message response has a Listen section in its definition that specifies what message type corresponds to the given message response. If a message matches the definition in the Listen section, it is executed by the message response in 2022. If there is no match between any of the received messages and the message responses, CPU 202 (FIG. 2), under instructions of the DAP runtime, loops back to 2016 and listens for the next message.

At 2022, CPU 202 (FIG. 2) executes message response object code corresponding to an appropriate message and may generate one or more messages to be sent out. The message response may call any external code library. In some embodiments, the message response may call executable code that reads or writes to external sources of data, such as a relational database, a flat file, or other source of stored data. If any messages are generated, they are passed on to services for processing in 2016. If no messages are generated, CPU 202 (FIG. 2), under instructions of the DAP runtime, loops back to 2016 and stays idle until the next message is received. An illustrative embodiment of further operations involved in 2022 is described below in FIG. 22

Figure 21:
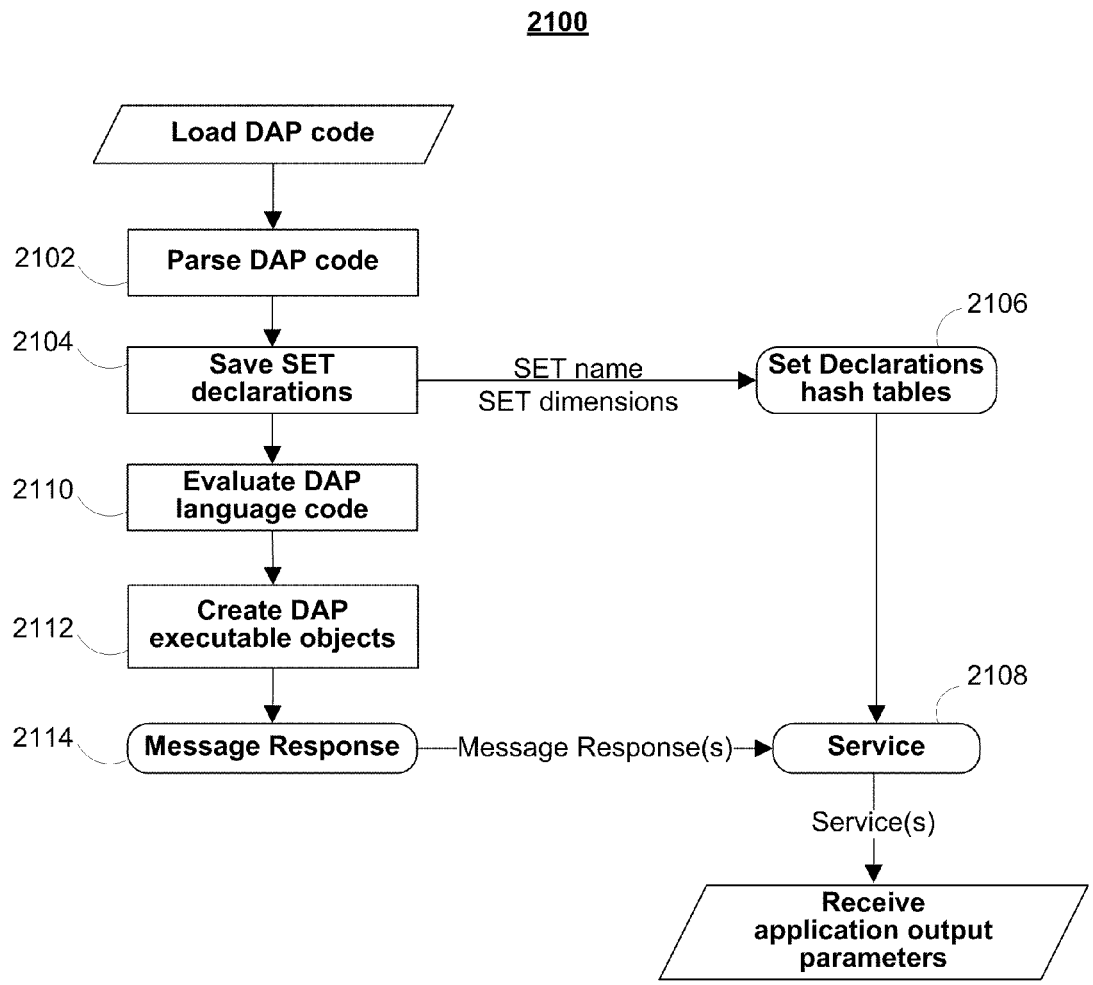
FIG. 21 shows operations of a CPU when building a DAP application under instructions of a DAP runtime environment, in accordance with an embodiment of the invention.

FIG. 21 describes an illustrative embodiment of operation 2006 (FIG. 20) showing operations of CPU 202 (FIG. 2) when building a DAP application under instructions of DAP runtime environment 220 (FIG. 2).

At 2102, CPU 202 (FIG. 2) parses DAP application code 2002 (FIG. 20) under instructions of DAP runtime environment 220 (FIG. 2). In some embodiments, the parsing process may include breaking up application code into tokens, determining grammatical structure with respect to given programming language grammar, and building a data structure that represents functionality of given application. This may be accomplished via custom-written tools or readily available third party tools.

At 2104, CPU 202 (FIG. 2) extracts set declarations (including set name and dimensions) from parsed DAP application code and saves them as part of Services 2108 in DAP runtime environment 220 (FIG. 2). The set declarations help define set data structure hash tables 2106 (as, for example, described in FIG. 11) which are also saved as part of services 2108. At 2110, CPU 202 (FIG. 2) evaluates parsed DAP application code and extracts declarations and definitions for services, message responses, and message response fields for listen, set instance, expressions, move/create/delete, and send instructions.

At 2112, CPU 202 (FIG. 2) creates executable objects from the parsed code obtained in 2006, under instructions of DAP runtime environment 220 (FIG. 2). CPU 202 (FIG. 2) creates one or more Services 2108, where each service object may include set declarations and one or more Message Response objects 2114. Each message response object may include fields for response name, and listen, set instance, expressions, move/create/delete, and send instructions. Message Responses 2114 are saved as part of Services 2108. One or more Services 2108 comprise a DAP application. The DAP application is built and ready for execution at the end of 2108.

Figure 22:
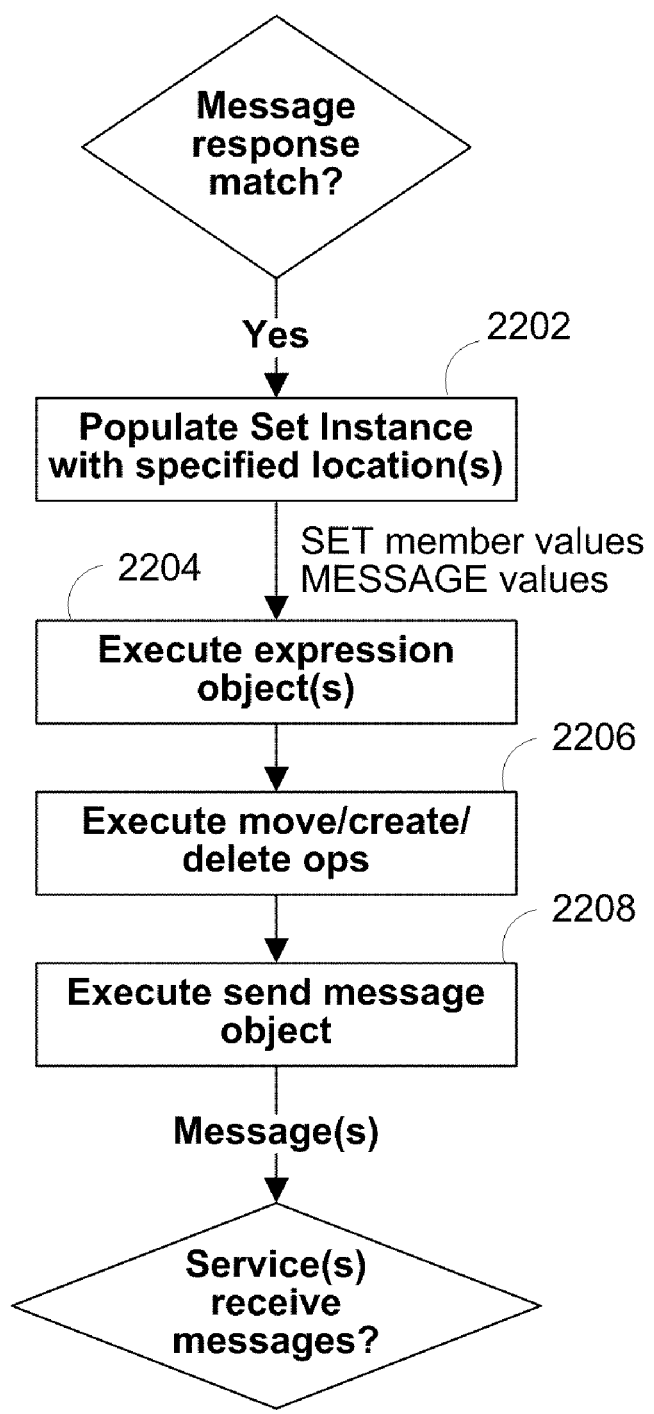
FIG. 22 shows operations of a CPU when processing a message under instructions of a message response in a DAP runtime environment, in accordance with an embodiment of the invention.

FIG. 22 describes an illustrative embodiment of operation 2022 (FIG. 20) showing operations of CPU 202 (FIG. 2) when processing a message under instructions of a message response in DAP runtime environment 220 (FIG. 2).

At 2202, CPU 202 (FIG. 2) processes the Set Instance definition of message response 2114 (FIG. 21). CPU 202 (FIG. 2) proceeds to populate a set instance with pointers to members of the set requested by the Set Instance definition, e.g., by executing a query. Illustrative embodiments of further operations involved in 2202 is described below in FIGS. 23 and 24.

At 2204, CPU 202 (FIG. 2) executes instructions from the Expressions section of message response 2114 (FIG. 21). These instructions execute upon the set instance, and field values from the received message. These instructions may involve some manipulation or calculations on the set, e.g., calculating mean of given data.

At 2206, CPU 202 (FIG. 2) executes Move/Create/Delete instructions of message response 2114 (FIG. 21) on the set. These instructions update the set members as specified in the message response, and may include instructions for creating or deleting a set, or for creating, updating, moving, or deleting members within a set. Illustrative embodiments of further operations involved in 2206 is described below in FIGS. 23 and 24.

At 2208, CPU 202 (FIG. 2) executes Send instructions of message response 2114 (FIG. 21). Send instructions may create messages to be sent out to an external server, or injected into the message stream for the DAP application (e.g., message stream 108 in FIG. 1). If CPU 202 (FIG. 2) generates any messages, they are injected into the outgoing message stream (e.g., message stream 112 in FIG. 1).

Figure 23:
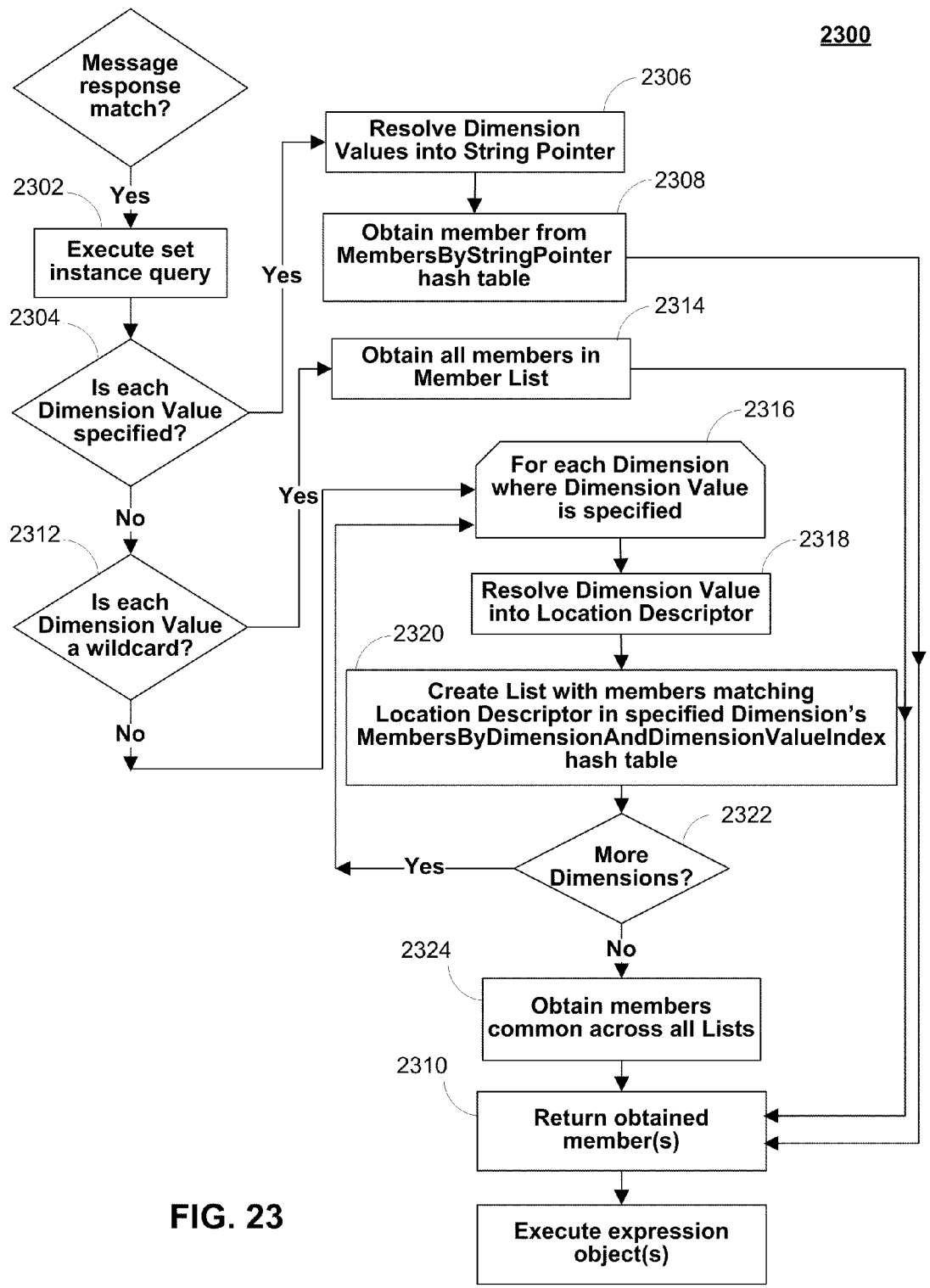
FIG. 23 shows operations of a CPU when populating a set instance under instructions of a message response in a DAP runtime environment, in accordance with an embodiment of the invention.

FIG. 23 describes an illustrative embodiment of operation 2202 (FIG. 22) showing operations of CPU 202 (FIG. 2) when populating a set instance under instructions of a message response in DAP runtime environment 220 (FIG. 2). This embodiment uses set data structure implementation according to set 1100.

At 2302, CPU 202 (FIG. 2) executes a query on a set, as specified in Set Instance definition of message response 2114 (FIG. 21). For example, query (IBM, 40) requests a member with Symbol dimension value IBM and Price dimension value 40 from a set with dimensions, Symbol and Price. A query may contain a wildcard (*) for a particular dimension value when requesting multiple members, or when all possible values for the particular dimension are acceptable.

At 2304, CPU 202 (FIG. 2) checks if the query has each dimension value specified (as opposed to one or more wildcards). If so, at 2306, CPU 202 (FIG. 2) obtains corresponding ordinal value indexes (or location descriptors) for each of the specified dimension values from the respective DimensionValueIndexes hash table 1104 (FIG. 11). The value indexes are then concatenated to form a string pointer. At 2308, CPU 202 (FIG. 2) uses the string pointer to key into MembersByStringPointer hash table 1110 (FIG. 11) and obtain the member corresponding to the query. At 2310, any members referenced are returned to message response 2114 (FIG. 21) for processing.

If the query does not have all dimension values specified, then CPU 202 (FIG. 2) proceeds to operation 2312 to check if each dimension in the query is specified as a wildcard (*). If so, CPU 202 (FIG. 2) obtains all members in member list 1102 (FIG. 11) (operation 2314). CPU 202 (FIG. 2) then proceeds to 2310, and returns any members referenced to message response 2114 (FIG. 21) for processing.

If the query has some dimension values specified, while others are wildcards, CPU 202 (FIG. 2) proceeds to operation 2316 to resolve the query. Operations 2318 and 2320 are repeated for each dimension where a dimension value is specified, i.e., no wildcard (*) is entered. At 2318, CPU 202 (FIG. 2) obtains the location descriptor corresponding to the specified dimension value from the specified dimension's DimensionValueIndexes hash table 1104 (FIG. 11). At 2320, CPU 202 (FIG. 2) creates a list with members matching the location descriptor from 2318 in the specified dimension's MembersByDimensionAndDimensionValueIndex hash table 1108 (FIG. 11). At 2322, CPU 202 (FIG. 2) checks if any more dimensions with value specified remain unprocessed. If so, CPU 202 (FIG. 2) repeats 2318 and 2320 for the remaining dimensions. At 2324, CPU 202 (FIG. 2) takes the intersection of all member lists created in 2320, i.e., obtains all members that are in common across the lists. This intersection removes any members that have dimension values other than those specified in the query. For example, if the query in consideration was (IBM, *), the intersection would remove any members with Symbol dimension values other than IBM. CPU 202 (FIG. 2) then proceeds to 2310, and returns any members referenced to message response 2114 (FIG. 21) for processing.

Figure 24:
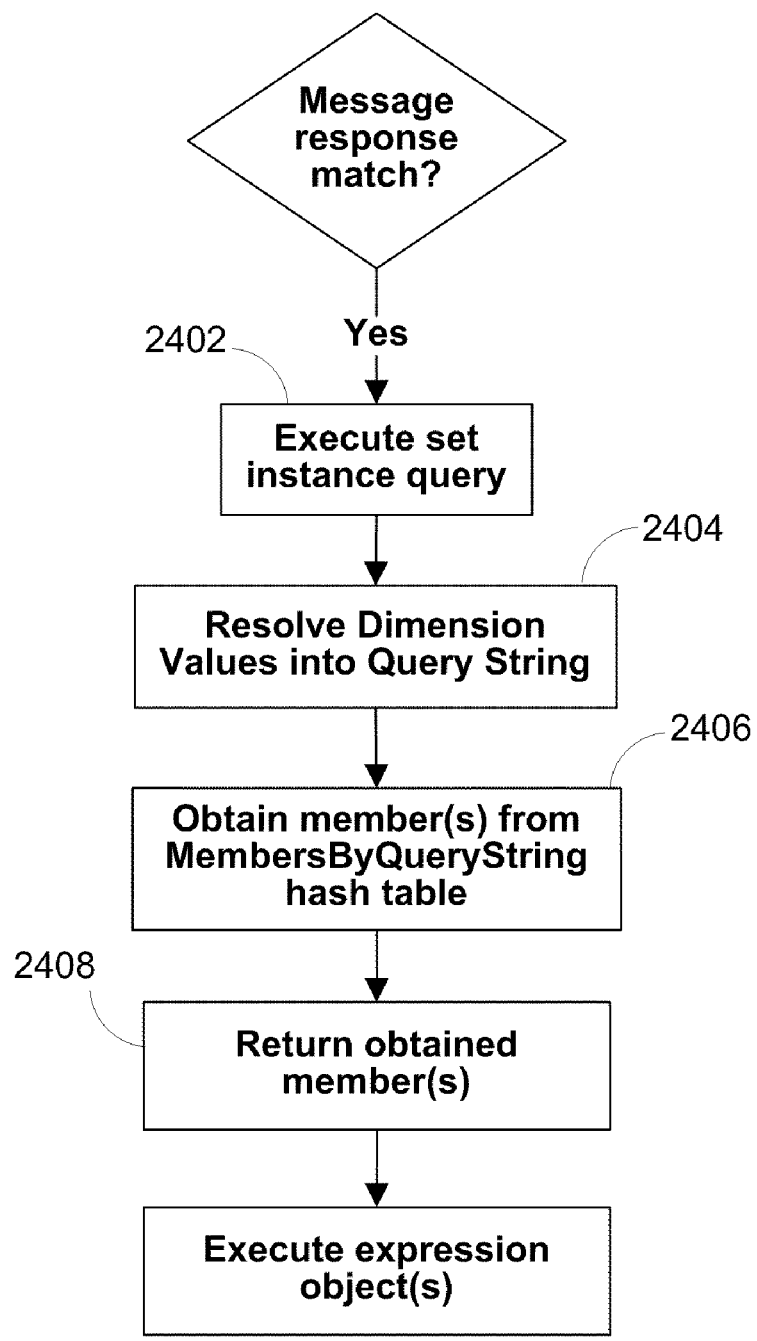
FIG. 24 shows operations of a CPU when populating a set instance under instructions of a message response in a DAP runtime environment, in accordance with another embodiment of the invention.

FIG. 24 describes an illustrative embodiment of operation 2202 (FIG. 22) showing operations of CPU 202 (FIG. 2) when populating a set instance under instructions of a message response in DAP runtime environment 220 (FIG. 2). This embodiment uses set data structure implementation according to set 1200.

At 2402, CPU 202 (FIG. 2) executes a query on a set, as specified in Set Instance definition of message response 2114 (FIG. 21). A query may contain a wildcard (*) for a particular dimension value when requesting multiple members, or when all possible values for the particular dimension are acceptable.

At 2404, CPU 202 (FIG. 2) resolves the query into a query string to key into MembersByQueryString hash table 1206. CPU 202 (FIG. 2) obtains corresponding ordinal value indexes (or location descriptors) for each of the specified dimension values from the respective DimensionValueIndexes hash table 1204 (FIG. 12). Where the specified dimension is a wildcard (*) (i.e., query type entry 0), the value index is set to −1. The value indexes are then concatenated to form a query string. At 2406, CPU 202 (FIG. 2) uses the query string to key into MembersByQueryString hash table 1206 (FIG. 12) and obtain one or more members corresponding to the query. At 2408, any members referenced are returned to message response 2114 (FIG. 21) for processing.

Figure 25:
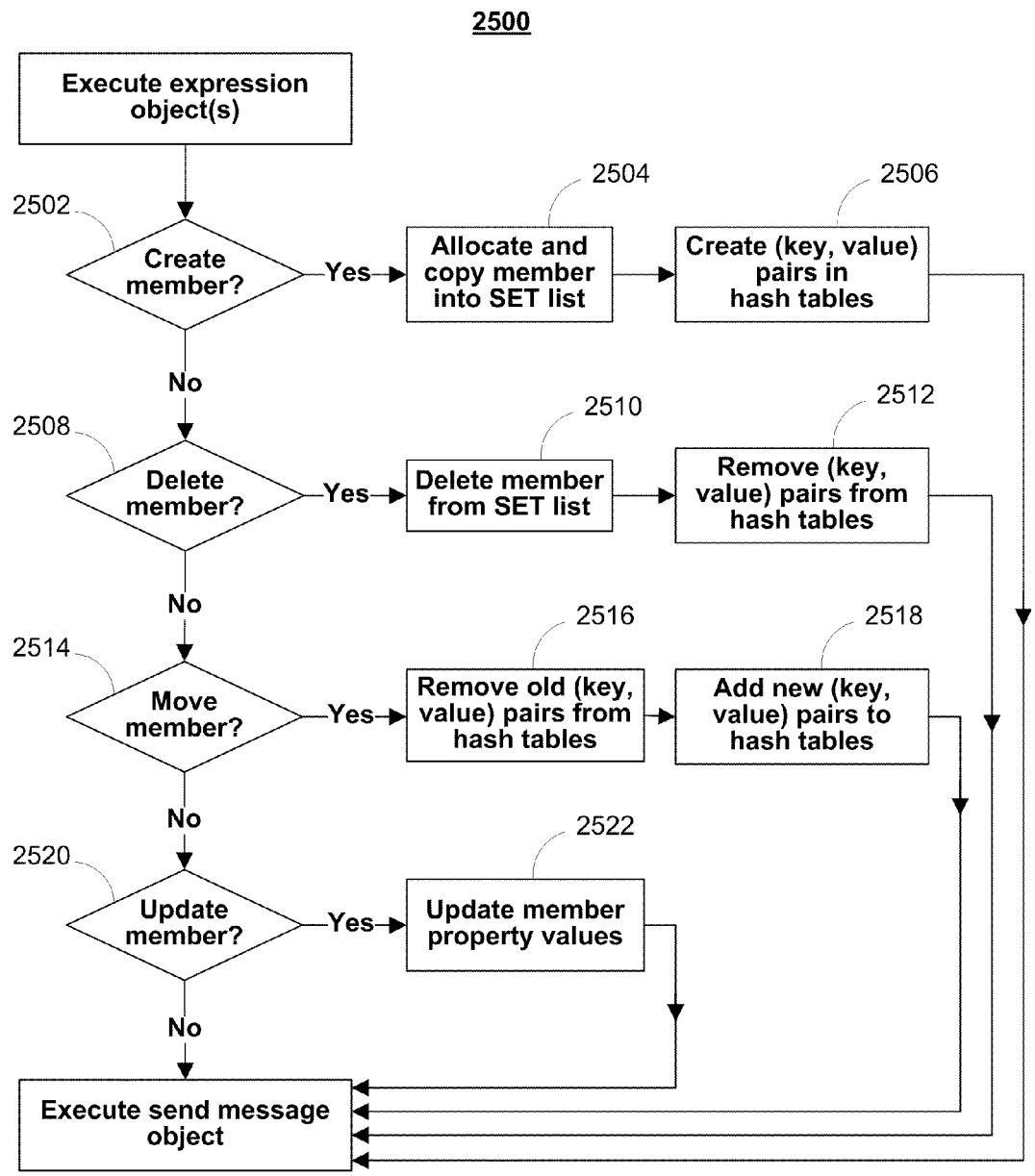
FIG. 25 shows operations of a CPU when performing set operations under instructions of a message response in a DAP runtime environment, in accordance with an embodiment of the invention.

FIG. 25 describes an illustrative embodiment of operation 2206 (FIG. 22) showing operations of CPU 202 (FIG. 2) when performing set operations under instructions of a message response in DAP runtime environment 220 (FIG. 2). This embodiment uses set data structure implementation according to set 1100.

At 2502, CPU 202 (FIG. 2) checks if move/create/delete instructions in message response 2114 (FIG. 21) instruct a member be created in the set. If so, at 2504, CPU 202 (FIG. 2) allocates the member, populates its dimension values, populates its scalar values (according to Expressions in message response 2114 (FIG. 21)), and copies the member into the set's member list 1102 (FIG. 11). At 2506, CPU 202 (FIG. 2) fills in hash table entries in set data structure 1100 (FIG. 11) corresponding to the added member.

At 2508, CPU 202 (FIG. 2) checks if move/create/delete instructions in message response 2114 (FIG. 21) instruct a member be deleted in the set. If so, at 2510, CPU 202 (FIG. 2) deletes the member from the set's member list 1102 (FIG. 11). At 2512, CPU 202 (FIG. 2) removes hash table entries in set data structure 1100 (FIG. 11) corresponding to the deleted member.

At 2514, CPU 202 (FIG. 2) checks if move/create/delete instructions in message response 2114 (FIG. 21) instruct a member be moved within the set. If so, at 2516, CPU 202 (FIG. 2) removes hash table entries in set data structure 1100 (FIG. 11) corresponding to the member's old dimension values. At 2518, CPU 202 (FIG. 2) fills in hash table entries in the set data structure 1100 (FIG. 11) corresponding to the member's new dimension values. CPU 202 (FIG. 2) updates dimension values for the member stored in set member list 1102 (FIG. 11). Operations 2516 and 2518 illustrate how a member's unique location is preserved in the set, as specified by its dimension values.

At 2520, CPU 202 (FIG. 2) checks if expressions in message response 2114 (FIG. 21) instruct a member's scalar properties (not associated with any dimension) be updated. If so, at 2522, CPU 202 (FIG. 2) updates the member scalar values (stored in set member list 1102 (FIG. 11)) as specified in message response 2114 (FIG. 21). The DAP system allows for move/create/delete instructions and expressions to be left empty, in which case no operations are performed and message response 2114 (FIG. 21) proceeds to processing Send instructions.

Figure 26:
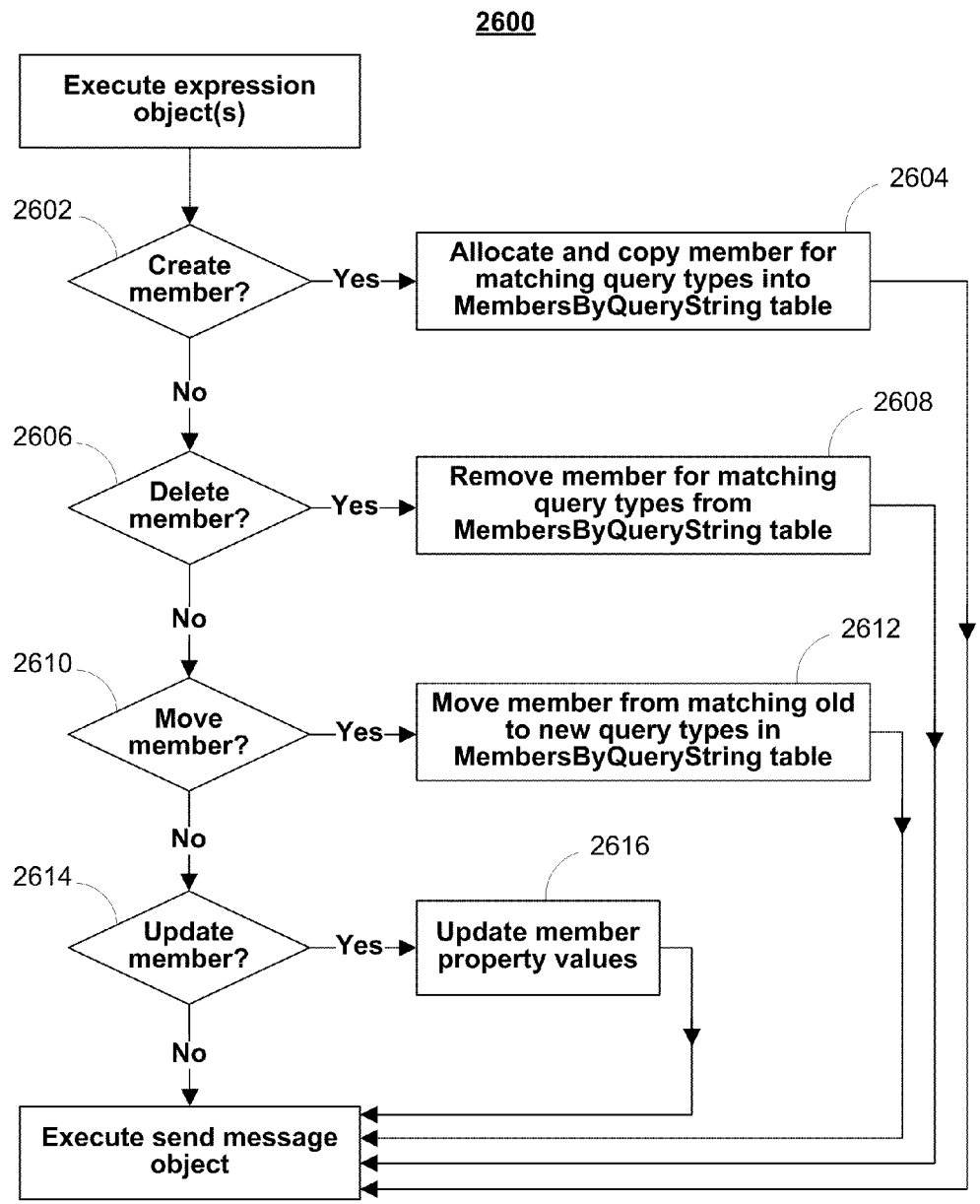
FIG. 26 shows operations of a CPU when performing set operations under instructions of a message response in a DAP runtime environment, in accordance with another embodiment of the invention.

FIG. 26 describes an illustrative embodiment of operation 2206 (FIG. 22) showing operations of CPU 202 (FIG. 2) when performing set operations under instructions of a message response in DAP runtime environment 220 (FIG. 2). This embodiment uses set data structure implementation according to set 1200.

At 2602, CPU 202 (FIG. 2) checks if move/create/delete instructions in message response 2114 (FIG. 21) instruct a member be created in the set. If so, at 2604, CPU 202 (FIG. 2) allocates the member, populates its dimension values, populates its scalar values (according to Expressions in message response 2114 (FIG. 21)), and copies pointers to the member into each matching query index in MembersByQueryString hash table 1206 (FIG. 12). For example, MembersByQueryString hash table may have two indexes, "5,1" and "5,−1". Value index 5 may correspond to dimension value IBM, and value index 1 may correspond to dimension value 10. The two indexes, "5,1" and "5,−1", would correspond to (IBM, 10) and (IBM, *) respectively. A new member, (IBM, 20), would be added to the member list at index "5,−1", but not at index "5,1". Member (IBM, 20) does not match query index "5,1". CPU 202 (FIG. 2) updates hash table entries in DimensionValueIndexes hash tables 1204 (FIG. 12) corresponding to the added member.

At 2606, CPU 202 (FIG. 2) checks if move/create/delete instructions in message response 2114 (FIG. 21) instruct a member be deleted in the set. If so, at 2608, CPU 202 (FIG. 2) deletes the member, and pointers to the member from each matching query index MembersByQueryString hash table 1206 (FIG. 12). CPU 202 (FIG. 2) updates hash table entries in DimensionValueIndexes hash tables 1204 (FIG. 12) corresponding to the deleted member.

At 2610, CPU 202 (FIG. 2) checks if move/create/delete instructions in message response 2114 (FIG. 21) instruct a member be moved within the set. If so, at 2612, CPU 202 (FIG. 2) removes the member from query indexes in MembersByQueryString hash table 1206 (FIG. 12) corresponding to the member's old dimension values. CPU 202 (FIG. 2) then adds the member to query indexes in MembersByQueryString hash table 1206 (FIG. 12) corresponding to the member's new dimension values. CPU 202 (FIG. 2) updates hash table entries in DimensionValueIndexes hash tables 1204 (FIG. 12) corresponding to the moved member.

At 2614, CPU 202 (FIG. 2) checks if expressions in message response 2114 (FIG. 21) instruct a member's scalar properties (not associated with any dimension) be updated. If so, at 2616, CPU 202 (FIG. 2) updates the member scalar values (stored in MembersByQueryString hash table 1206) as specified in message response 2114 (FIG. 21). The DAP system allows for move/create/delete instructions and expressions to be left empty, in which case no operations are performed and message response 2114 (FIG. 21) proceeds to processing Send instructions.

The above described embodiments of the present invention are presented for purposes of illustration and not of limitation, and the present invention is limited only by the claims which follow.

What is claimed is:

1. A method executed by a processor for message-based distributed computing, the method comprises:
   receiving a plurality of instructions for an application, wherein:
      the instructions are organized into a plurality of message responses, each message response comprising:
         an expression; and
         a set instance definition which identifies a plurality of members of the set for use by the expression, wherein:
            the set is a data structure having a plurality of dimensions; and
            each member of the set is stored in a unique location defined by dimension values unique to each member, and comprises a scalar value which does not define the member's location in the set; and
            the set instance definition identifies members of the set for use by the expression using dimension values;
   building an application from the received plurality of instructions;
   initiating execution of the application;
   creating a set in memory for the application;
   receiving, during execution of the application, an electronic message from a message stream, wherein the message comprises dimension values;
   matching the message to a message response; and
   executing the expression of the matched message response on the members of the set identified by the set instance definition, wherein the set instance definition identifies members using dimension values derived from the message.

2. The method of claim 1 wherein:
   the set instance definition further assigns the identified plurality of members of the set to a single variable.

3. The method defined in claim 1, wherein:
   each message response further comprises a move instruction; and
   the move instruction changes a dimension value of members of the set and moves said members to new unique locations within the set based on the new dimension values.

4. The method of claim 1 wherein:
   the message further comprises a scalar value; and
   executing the expression comprises assigning the scalar value of the message to the scalar property of the members of the set identified by the set instance definition.

5. The method of claim 1 wherein the set instance definition further identifies members of the set using a wild card dimension value, wherein the wild card identifies all members of a given dimension.

6. The method of claim 1 wherein each message response comprises a send instruction, wherein the send instruction causes a message to be sent into the message stream.

7. The method of claim 6 wherein the sent message is received by the application and has a matching message response.

8. The method of claim 6 wherein the sent message is received by another application having a matching message response.

9. The method of claim 1 wherein initiating execution of the application comprises:
   receiving an application output parameter;
   connecting to an external message source;
   starting an application service; and
   receiving a startup message for the application.

10. The method of claim 1 wherein the set data structure comprises a list and a plurality of hash tables.

11. The method of claim 10 wherein the list is a list of the members in the set, and the plurality of hash tables comprises:
   for each dimension in the set, a hash table mapping a dimension value of the dimension to an ordinal index;
   for each dimension in the set, a hash table mapping an ordinal index to at least one member; and
   a hash table mapping a string of ordinal indexes, corresponding to dimension values of a member, to the member in the set.

12. The method of claim 10 wherein the list is a list of query types for the set, and the plurality of hash tables comprises:
   for each dimension in the set, a hash table mapping a dimension value of the dimension to an ordinal index; and
   a hash table mapping a string formed from ordinal indexes and a query type, corresponding to dimension values of a member, to the member in the set.

13. The method of claim 1 wherein the application is for a securities trading system.

14. The method of claim 1 wherein:
   processing the set instance definition causes a query to be executed on the set, using the dimension values from the message, to identify the members of the set.

15. A programming interface for message-based distributed computing comprising a processor configured to:
   generate for display a plurality of cells organized into rows and columns, wherein each row receives a message response, a column receives listen instructions for each message response, a column receives set instance definitions for each message response, and a column receives expressions for each message response;

receive, from a user input device, message responses for an application, wherein:
  each listen instruction comprises a message type matching the message response;
  each expression comprises an operation executed on members of the set identified by the set instance definition; and
  each set instance definition identifies a plurality of members of the set for use by the expression, wherein:
    the set is a data structure having a plurality of dimensions; and
    each member of the set is stored in a unique location defined by dimension values unique to each member, and comprises a scalar value which does not define the member's location in the set; and
    the set instance definition identifies members of the set for use by the expression using dimension values.

16. The programming interface of claim 15 wherein the processor further receives, from the user input device, at least one of a:
  a type declaration, wherein the type declaration declares a variable type for the scalar property of each member of the set;
  a set declaration, wherein the set declaration declares the plurality of dimensions of the set; and
  a message declaration, wherein the message declaration declares a message type comprising a dimension and a scalar property.

17. The programming interface of claim 15 wherein message responses for an application further comprise:
  each response name identifies a message response;
  each move instruction changes a dimension value of members of the set and moves said members to new unique locations within the set based on the new dimension values; and
  each send instruction comprises an operation to create and send a message into a message stream.

18. A message-based distributed computing system, the system comprising:
  a processor;
  a network interface, in communication with the processor, for communicating with a network;
  a memory, in communication with the processor, for storing a runtime environment or a programming environment;
  the processor configured to:
  receive a plurality of instructions for an application, wherein:
    the instructions are organized into a plurality of message responses, each message response comprising:
      an expression; and
      a set instance definition which identifies a plurality of members of the set for use by the expression, wherein:
        the set is a data structure having a plurality of dimensions; and
        each member of the set is stored in a unique location defined by dimension values unique to each member, and comprises a scalar value which does not define the member's location in the set; and
        the set instance definition identifies members of the set for use by the expression using dimension values;
  build an application from the received plurality of instructions;
  initiate execution of the application;
  create a set in memory for the application;
  receive from the network interface, during execution of the application, an electronic message from a message stream, wherein the message comprises dimension values;
  match the message to a message response; and
  execute the expression of the matched message response on the members of the set identified by the set instance definition, wherein the set instance definition identifies members using dimension values derived from the message.

19. The system of claim 18 wherein:
  the set instance definition further assigns the identified plurality of members of the set to a single variable.

20. The system defined in claim 18, wherein:
  each message response further comprises a move instruction; and
  the move instruction changes a dimension value of members of the set and moves said members to new unique locations within the set based on the new dimension values.

21. The system of claim 18 wherein:
  the message further comprises a scalar value; and
  executing the expression comprises assigning the scalar value of the message to the scalar property of the members of the set identified by the set instance definition.

22. The system of claim 18 wherein the set instance definition further identifies members of the set using a wild card dimension value, wherein the wild card identifies all members of a given dimension.

23. The system of claim 18 wherein each message response comprises a send instruction, wherein the send instruction causes a message to be sent into the message stream.

24. The system of claim 23 wherein the sent message is received by the application and has a matching message response.

25. The system of claim 23 wherein the sent message is received by another application having a matching message response.

26. The system of claim 18 wherein the step of initiating execution of the application comprises:
  receiving an application output parameter;
  connecting an external message source;
  starting an application service; and
  receiving a startup message for the application.

27. The system of claim 18 wherein the set data structure comprises a list and a plurality of hash tables.

28. The system of claim 27 wherein the list is a list of the members in the set, and the plurality of hash tables comprises:
  for each dimension in the set, a hash table mapping a dimension value of the dimension to an ordinal index;
  for each dimension in the set, a hash table mapping an ordinal index to at least one member; and
  a hash table mapping a string of ordinal indexes, corresponding to dimension values of a member, to the member in the set.

29. The system of claim 27 wherein the list is a list of query types for the set, and the plurality of hash tables comprises:
  for each dimension in the set, a hash table mapping a dimension value of the dimension to an ordinal index; and
  a hash table mapping a string formed from ordinal indexes and a query type, corresponding to dimension values of a member, to the member in the set.

30. The system of claim 18 wherein:

processing the set instance definition causes a query to be executed on the set, using the dimension values from the message, to identify the members of the set.

31. A message-based distributed securities trading system, the system comprising:

a processor;

a network interface, in communication with the processor, for communicating with a network;

a memory, in communication with the processor, for storing a runtime environment or a programming environment;

the processor configured to:

receive a plurality of instructions for a securities trading application, wherein:

the instructions are organized into a plurality of message responses, each message response comprising:

an expression; and a set instance definition which identifies a plurality of members of the set for use by the expression, wherein:

the set is a data structure having a plurality of dimensions; and each member of the set is stored in a unique location defined by dimension values unique to each member, and comprises a scalar value which does not define the member's location in the set; and the set instance definition identifies members of the set for use by the expression using dimension values;

build a securities trading application from the received plurality of instructions;

initiate execution of the securities trading application;

create a set in memory for the securities trading application;

receive from the network interface, during execution of the securities trading application, an electronic message from a securities quote message server, wherein the message comprises dimension values for at least one of a symbol, a quote, and an order status;

match the message to a message response;

execute the expression of the matched message response on the members of the set identified by the set instance definition, wherein the set instance definition identifies members for effecting securities transactions using dimension values derived from the message; and send a message, via the network interface, to a trading server to effect a securities transaction, conditional to execution of the expression.

32. The system defined in claim 31, wherein:

each message response further comprises a move instruction; and the move instruction changes the value of the order status dimension of members of the set and moves said members to new unique locations within the set based on the new order status dimension values.

33. The system of claim 31 wherein:

the message further comprises a scalar value; and executing the expression comprises assigning the scalar value of the message to the scalar property of the members of the set identified by the set instance definition.

34. The system of claim 31 wherein the set instance definition further identifies members of the set using a wild card dimension value, wherein the wild card identifies all members of a given dimension.

35. The system of claim 31 wherein the sent message is received by the application and has a matching message response.

36. The system of claim 31 wherein the sent message is received by another application having a matching message response.

* * * * *